(12) United States Patent
Stehlin et al.

(10) Patent No.: US 6,307,933 B1
(45) Date of Patent: Oct. 23, 2001

(54) APPARATUS FOR PROVIDING A PLURALITY OF PROVIDERS OF SUBSCRIBER SERVICE SIGNALS WITH EASY ACCESS TO AT LEAST ONE SUBSCRIBER PREMISES LINE

(75) Inventors: David S. Stehlin, Flemington; Anthony L. Nieves, Shark River Hills; Stanley Krawiec, Manalapan; Avraham Tuvy, Oakhurst, all of NJ (US)

(73) Assignee: Antec Corporation, Duluth, GA (US)

( * ) Notice: Subject to any disclaimer, the term of this patent is extended or adjusted under 35 U.S.C. 154(b) by 0 days.

(21) Appl. No.: 08/934,961

(22) Filed: Sep. 22, 1997

Related U.S. Application Data

(63) Continuation-in-part of application No. 08/762,189, filed on Dec. 9, 1996, now abandoned.

(51) Int. Cl.[7] .................................................. H04M 1/00

(52) U.S. Cl. ........................ 379/399; 379/412; 379/441

(58) Field of Search ...................... 379/399, 412, 379/413, 133, 442, 397, 326; 439/578, 579, 580, 498, 582, 583, 92; 361/601, 602, 641, 823–828

(56) References Cited

U.S. PATENT DOCUMENTS

| | | | |
|---|---|---|---|
| 4,945,559 | * | 7/1990 | Collins et al. ........................ 379/399 |
| 4,945,560 | * | 7/1990 | Collins et al. ........................ 379/399 |
| 5,309,123 | * | 5/1994 | Gelin .................................... 379/399 |
| 5,394,466 | * | 2/1995 | Schneider et al. .................... 379/399 |
| 5,583,931 | * | 12/1996 | Schneider et al. .................... 379/399 |
| 5,583,932 | * | 12/1996 | Schneider et al. .................... 379/412 |
| 5,600,717 | * | 2/1997 | Schneider et al. .................... 379/399 |
| 5,606,606 | * | 2/1997 | Schneider et al. .................... 379/399 |
| 5,623,542 | * | 4/1997 | Schneider et al. .................... 379/399 |

* cited by examiner

Primary Examiner—Wing F. Chan
(74) Attorney, Agent, or Firm—Troutman Sanders LLP; Gerald R. Ross, Esq.; James E. Schultz, Esq.

(57) ABSTRACT

Apparatus providing at least one subscriber with subscriber service signals, telephone line signals and/or broadband signals, from one of at least two providers of such signals, including a connector for terminating at least one subscriber premises line, connectors for terminating incoming service lines from at least two providers of subscriber service signals and for permitting either provider of subscriber service signals to connect its incoming service line to the subscriber premises line and for permitting either provider to disconnect from the subscriber premises line the incoming service line of the other provider previously connected to the subscriber premises line and thereafter connect its incoming service line to the subscriber premises line.

46 Claims, 21 Drawing Sheets

US 6,307,933 B1

APPARATUS FOR PROVIDING A PLURALITY OF PROVIDERS OF SUBSCRIBER SERVICE SIGNALS WITH EASY ACCESS TO AT LEAST ONE SUBSCRIBER PREMISES LINE

CROSS-REFERENCE TO RELATED APPLICATIONS

This application is a continuation-in-part of pending U.S. patent application Ser. No. 08/762,189, filed Dec. 9, 1996, abandoned, David S. Stehlin, Anthony L. Nieves and Stanley Krawiec, inventors, entitled APPARATUS FOR PROVIDING A PLURALITY OF SERVICE PROVIDERS WITH EASY ACCESS TO A SUBSCRIBER PREMISES LINE, which application is assigned to the same assignee as the present invention.

BACKGROUND OF THE INVENTION

Numerous apparatus are known to the art for interconnecting a telephone subscriber premises line to an incoming telephone company line. Also apparatus are known to the art for connecting incoming cable television signals to a television subscriber's television set. Further, combination apparatus are known to the art for interconnecting both an incoming telephone company line to a telephone subscriber premises line and an incoming cable television signals to a television subscriber's television set. For example, apparatus for connecting an incoming telephone line with a telephone subscriber premises line are disclosed in U.S. Pat. No. 4,979,209 entitled INDIVIDUAL SUBSCRIBER LINE MODULE, patented Dec. 18, 1990, Thomas J. Collins et al. inventors, and assigned to the assignee of the present invention. U.S. Pat. No. 4,979,209 is incorporated herein by reference as if fully reproduced herein and is referred to hereinafter as "the '209 patent." Other apparatus for interconnecting an incoming telephone line with a telephone subscriber premises line is disclosed in U.S. Pat. No. 5,297,199 entitled APPARATUS FOR CONNECTING AND DISCONNECTING SUBSCRIBER PREMISES LINE AND INCOMING TELEPHONE COMPANY LINE, Thomas G. Graham et al. inventors, patented Mar. 22, 1994 and assigned to the same assignee as the present invention. U.S. Pat. No. 5,297,199 is incorporated herein by reference as if fully reproduced herein and is referred to hereinafter as "the '199 patent." Combination telephone and cable television interconnecting apparatus are disclosed in U.S. Pat. No. 5,394,466 entitled COMBINATION TELEPHONE NETWORK INTERFACE AND CABLE TELEVISION APPARATUS AND CABLE TELEVISION MODULE, Pina Schneider et al. inventors, patented Feb. 28, 1995 and assigned to the same assignee as the present invention. U.S. Pat. No. 5,394,466 is incorporated herein by reference as if fully reproduced herein and is referred to hereinafter as "the '466 patent."

Generally, these prior art apparatus are for connecting a subscriber's premises line with an incoming telephone company line from a single telephone company, or single provider of telephone signals, or for connecting a customer's television set with incoming cable television signals from a single cable television company or single provider of cable television signals, or combinations thereof.

The "telephone line," as known to those skilled in the art, typically comprises a pair of copper or copper alloy conductors sometimes referred to as a twisted pair or a twisted pair of copper or copper alloy conductors. The term "telephone line signals" as used herein and in the appended claims means telephone signals, video signals, data signals, and any other signal that can be transmitted over a telephone line including signals which can be transmitted over a telephone line using signal compression techniques, signal rate enhancement techniques, or any other technique for increasing or enhancing the signal transmitting capability or capacity of a telephone line. The term "broadband signals" as used herein and in the appended claims means video signals such as cable television signals, data signals, telephone signals, and any other signal that can be transmitted over a coaxial cable. The term "subscriber service signals," as used herein and in the appended claims, means "telephone line signals" and/or "broadband signals" as defined herein. The term "subscriber premises line" as used herein and in the appended claims means a telephone subscriber premises line for receiving telephone line signals and/or a subscriber coaxial cable for receiving broadband signals. The term "incoming service line" as used herein and in the appended claims means an incoming telephone line carrying telephone signals as defined herein and/or an incoming coaxial cable carrying broadband signals as defined herein.

The relatively recent availability to a subscriber or customer of at least some subscriber service signals from a plurality of providers of such subscriber service signals, has given rise to a need for apparatus for providing the plurality of subscriber service signal providers with easy access to the subscriber premises line to permit the service provider chosen by the subscriber to connect its incoming service line to the subscriber premises line. More particularly, such availability has given rise to the need for apparatus for permitting a service provider, newly chosen by the subscriber, to connect its incoming service line to the subscriber premises line, even if such connection requires the newly chosen service provider to disconnect the incoming service line of a previously chosen service provider before the newly chosen service provider can connect its incoming service line to the subscriber premises line.

SUMMARY OF THE INVENTION

It is the object of the present invention to provide apparatus satisfying the foregoing need in the art.

Apparatus satisfying the foregoing need in the art and embodying the present invention may include a plurality of connectors for being connected to at least one subscriber premises line and to incoming service lines from at least two providers of subscriber service signals and which connectors permit either provider to connect its incoming service line to the subscriber premises line and which permits either provider to disconnect from the subscriber premises line the incoming service line of the other provider and thereafter connect its incoming service line to the subscriber premises line.

DESCRIPTION OF THE PREFERRED EMBODIMENTS

Figure 1:
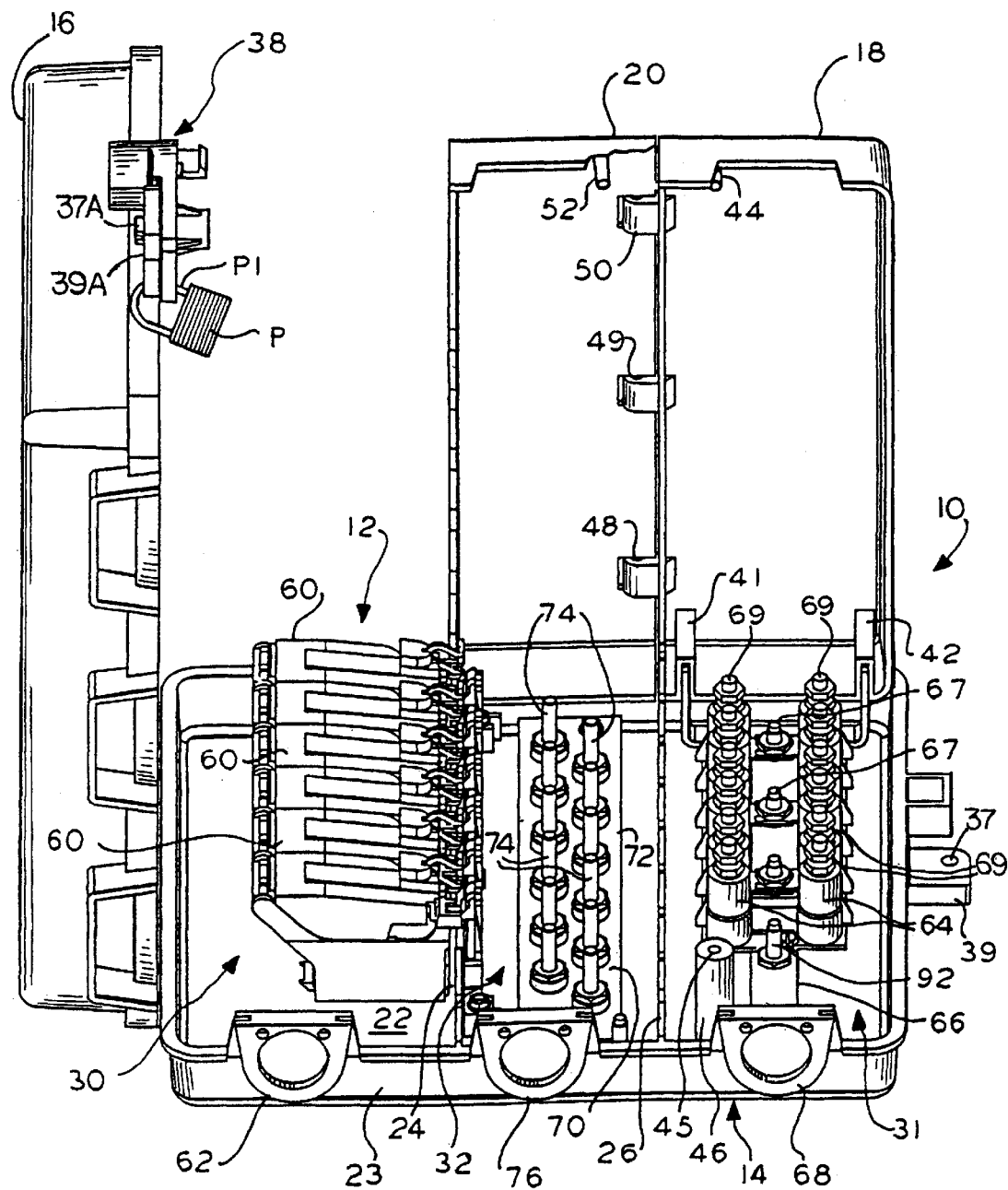
FIG. 1 is a top or front perspective view of a first embodiment of apparatus of the present invention showing the covers in the open positions.

A first embodiment of apparatus of the present invention is shown in FIGS. 1 to 6 and is indicated by general numerical designation 10. Apparatus 10 comprises a housing indicated by general numerical designation 12 and which housing includes a base indicated by general numerical designation 14 and doors or covers 16, 18 and 20. Base 14 includes a bottom 22 circumscribed by an outwardly extending wall 23. Extending outwardly from the bottom 22 is a longitudinally extending individual subscriber line module mounting member 24, FIGS. 1 and 2, which may be the same as, or substantially the same as, the longitudinally extending mounting member 120 disclosed in the '199 patent and shown in detail in FIG. 9 of such patent; mounting member 24 is secured to the bottom 22 by suitable means not shown. Also extending outwardly from the bottom 22 is a compartment separating wall 26 also secured to the bottom 22 by suitable means not shown; the separating wall is provided with a plurality of inwardly extending indentations 27 through which various jumper conductors may extend. The base 14, in particular bottom 22 and wall 23, cooperate with the mounting member 24 and the compartment separating member 26 to provide three compartments (note particularly FIGS. 1 and 2), a first compartment indicated by general numerical designation 30, a second compartment indicated by general numerical designation 31, and a third or intermediate compartment indicated by general numerical designation 32. The first compartment 30 is for receiving up to six subscriber premises lines, particularly telephone subscriber premises lines in this embodiment, and may be referred to as a subscriber compartment; accordingly, the cover 16 which closes this compartment as described below may be referred to as a subscriber cover. The second compartment 31 is for receiving an incoming service line, particularly an incoming telephone line in this embodiment, from a first provider of subscriber service signals, particularly telephone line signals in this embodiment, as will be described in detail below and may be referred to as a first provider of subscriber service signals compartment or a first provider compartment; accordingly, the cover 18 which closes this compartment as described below may be referred to as a first provider cover. The third compartment 32 is for receiving up to six incoming service lines, particularly incoming telephone lines in this embodiment, from a second provider of subscriber service signals, particularly telephone line signals in this embodiment, and may be referred to as a second provider of subscriber service signals compartment or a second provider compartment; accordingly, the cover 20 which closes this compartment as described below may be referred to as a second provider cover.

Figure 2:
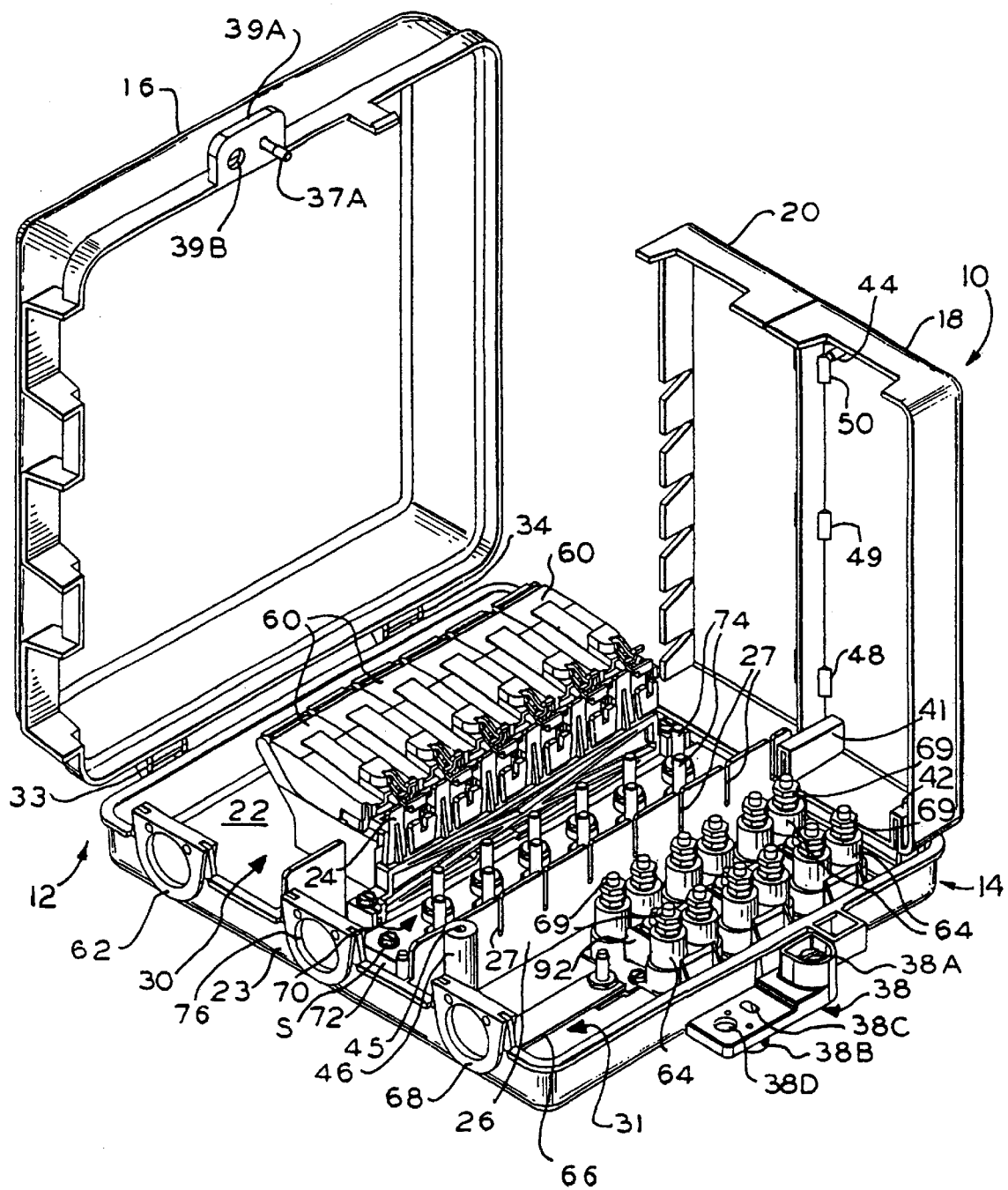
FIG. 2 is a perspective view similar to FIG. 1 but taken from a different perspective.
Figure 5:
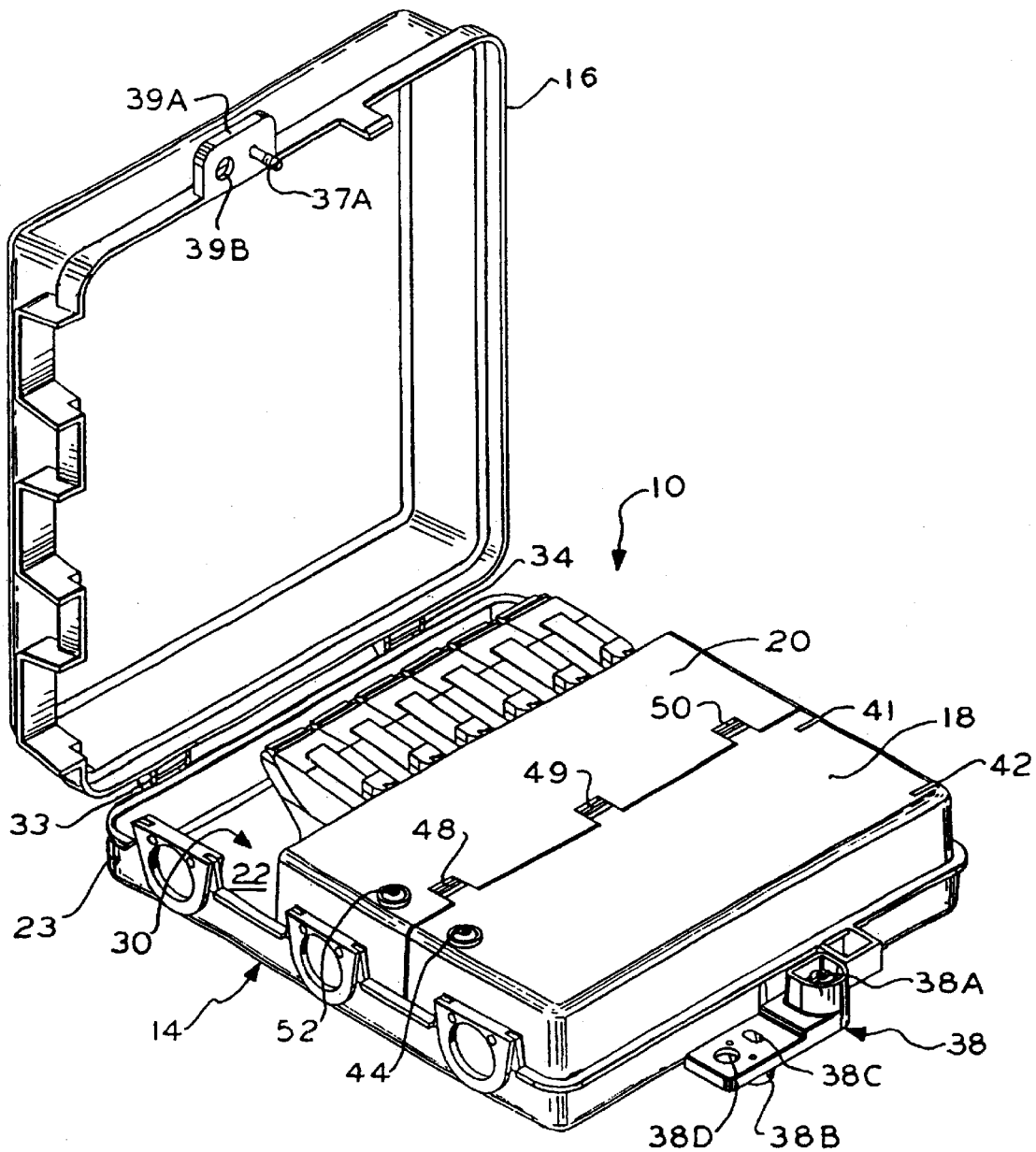
FIG. 5 is a front or top perspective view of the first apparatus embodiment of the present invention showing one cover in the open position and two covers in the closed position.

The cover 16, FIGS. 2 and 5, is mounted pivotally or hingedly to the base 14 by hinges 33 and 34 and upon being closed over the subscriber compartment 30 and over the covers 18 and 20 is for being fastened to the base 16 through an override member indicated by general numerical designation 38 shown in FIG. 2 and which override member is shown separately in FIGS. 5A and 5B and whose function is described in detail below.

The cover 18, FIGS. 1 and 2, is mounted pivotally or hingedly to the base 14 by hinges 41 and 42 and upon being closed over the first provider compartment 31 is fastened to the base 14 by a threaded member 44 mounted captively rotatably in the cover 18 and which threaded member 44 threadedly engages the threaded opening 45 provided centrally of the stud 46 extending upwardly from the housing bottom 22 and suitably secured thereto. The threaded member 44 (FIG. 5) is provided with a head of uncommon shape and the first provider of subscriber service signals possesses a tool of uncommon shape which permits only the first provider, and neither the second provider nor the subscriber, to unfasten the threaded member 44 and gain access to the first provider compartment 31. Alternatively, instead of the threaded member 44 having a head of uncommon shape a lock and key arrangement may be used to fasten the first provider cover closed over the first provider compartment 31 and only the first provider of subscriber service signals will have a key to unlock the lock and gain access to the first provider compartment 31.

Figure 4:
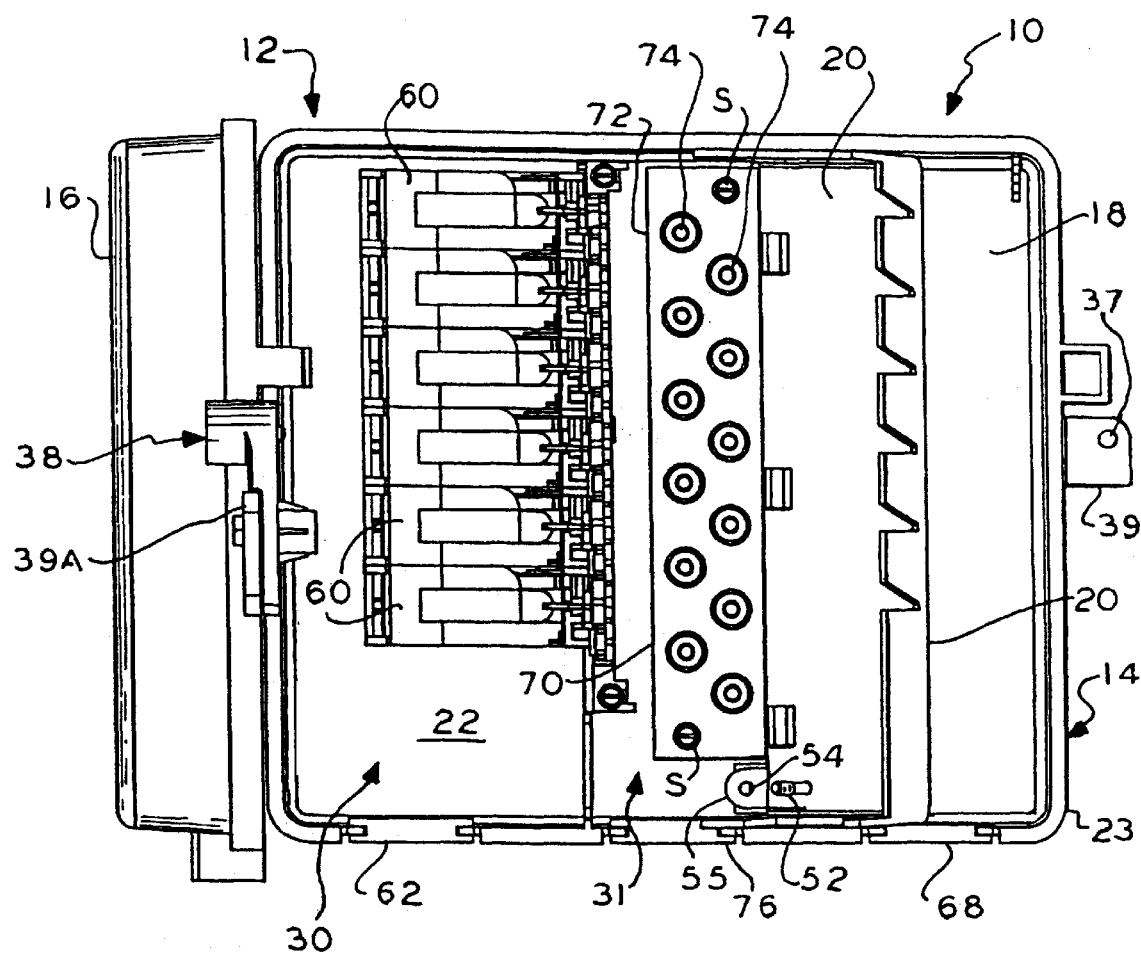
FIG. 4 is a top view of FIG. 3.

The cover 20, FIGS. 1, 2 and 5, is mounted pivotally or hingedly to the left side of the cover 18, as viewed in these FIGS., by suitable hinges 48, 49 and 50. The cover 20 is fastened closed over the compartment 32 by a threaded fastener 52, note FIGS. 1 and 4, mounted captively rotatably in the cover 20 for threaded engagement with a threaded opening 54, note FIG. 4, provided in a boss or tab 55 formed integrally with and extending outwardly from the cover 18. The threaded fastener 52 is provided with a head of uncommon shape whereby it may be rotated and unfastened only by a tool possessed by the first provider of subscriber service signals and the second provider of subscriber service signals whereby only the first and second providers of subscriber service signals, and not the subscriber, can unfasten the cover 30 and gain access to the second provider compartment 32 thereby denying others, including the subscriber and others, from gaining access to the second provider compartment.

Figure 3:
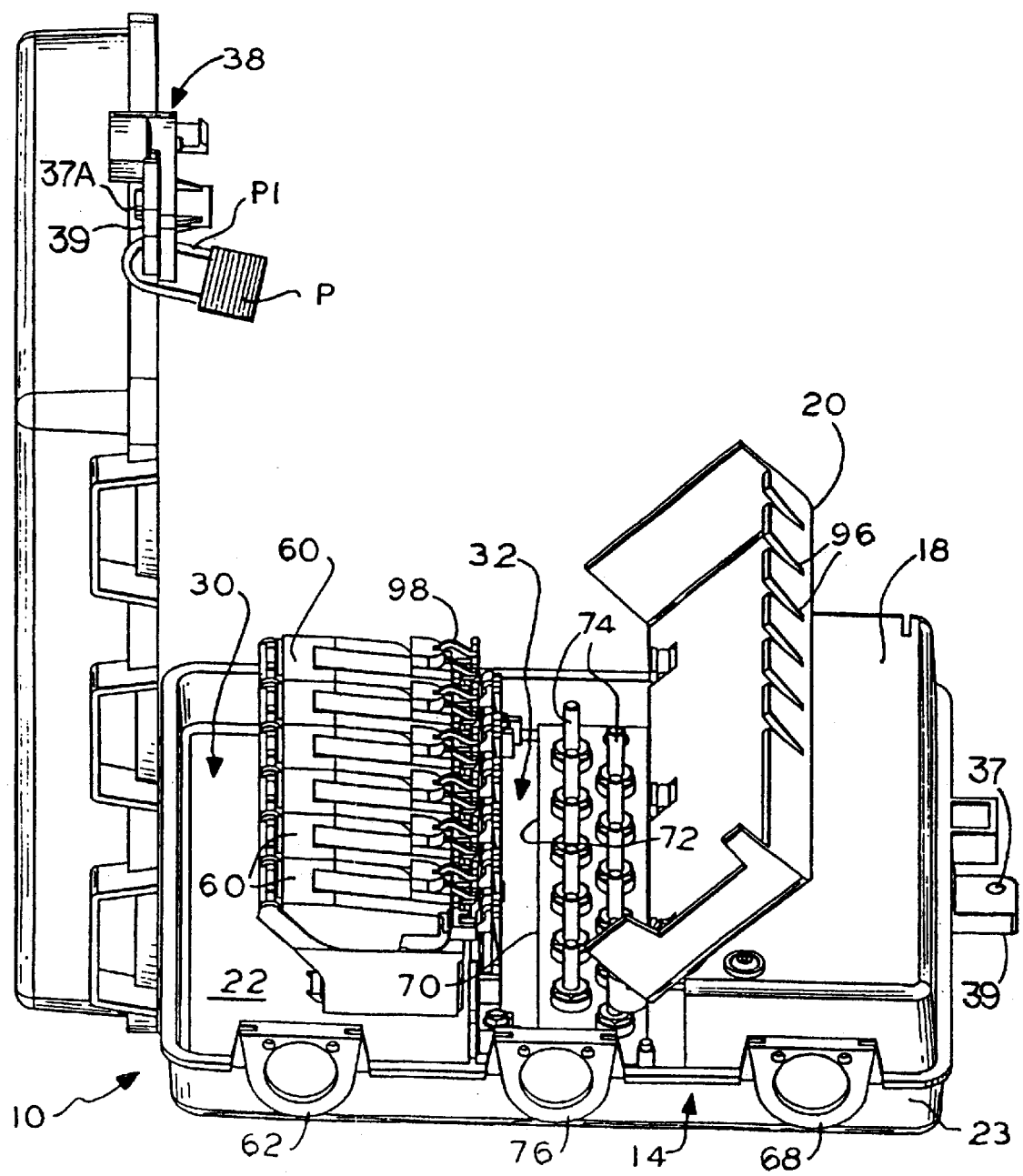
FIG. 3 is a front or top perspective view showing two covers in the open positions and a third cover in the closed position.
Figure 5A:
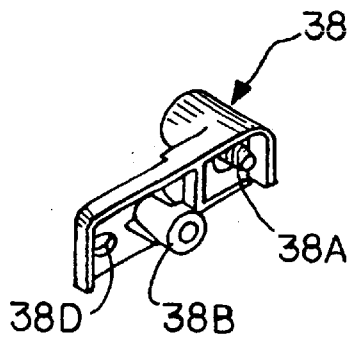
FIGS. 5A and 5B are views of an override member.
Figure 5B:
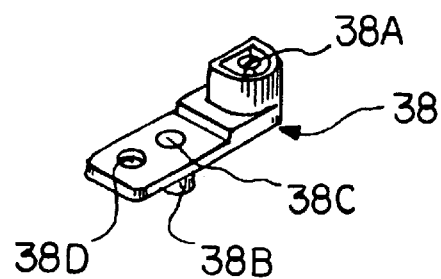

Referring now particularly to the override member 38, FIGS. 5A and 5B, the override member is provided with a threaded member 38A (FIG. 5A) mounted captively rotatably in the override member and a tab or stud 38B which is provided with a threaded opening 38C. In addition, the override member 38 is provided with a through hole or opening 38D for receiving the link or gooseneck portion of a padlock used by the subscriber to fasten the subscriber cover 16 to the override member 38 and thereby to the base 16. The override member 38 is normally threadedly fastened to a tab 39 extending outwardly from and formed integrally with the base 14, FIG. 1, by the threaded fastener 38A which is threadedly received in a threaded opening 37 formed in the tab 39. Referring to FIGS. 2 and 5, the subscriber cover 16 is provided with an outwardly extending and integrally formed tab 39A provided with a threaded fastener 37A mounted captively rotatably therein and provided with a through hole or opening 39B for receiving the link or gooseneck portion of the above-noted padlock. Upon the subscriber cover 16 being pivoted and closed over the subscriber compartment 30, FIGS. 5 and 6, and over the first and second provider covers 18 and 20, the subscriber rotates the threaded fastener 37A to threadedly engage the threaded opening 38C formed in the override member 38 to thereby fasten the subscriber cover 16 to the base 14 through the override member 38 whereby the subscriber and first and second providers, in the absence of the subscriber having padlocked the subscriber cover 16 to the base 14 as described below, normally used the threaded fastener 37A to unfasten the subscriber cover from the base. Upon the subscriber cover 16 being fastened to the base 14 the through hole or opening 39B formed in the tab 39A will overlie the through hole or opening 38D formed in the override member 38. Thereafter, the subscriber may deny others, except the first and second providers of subscriber service signals as will be described below, access to the subscriber compartment 30 by placing the link or gooseneck portion P1 of a padlock P (FIG. 6) through holes or openings 39B and 38D to lock the subscriber cover 16 to the override member 38 and thereby to the base 14. However, it will be understood that the subscriber may be absent at times when either the first or second provider of telephone line signals needs access to the first and/or second provider compartments 31 and 32 and/or the subscriber compartment 30, for reasons described in detail below. Since, as noted above, both the first and second providers of telephone line signals are provided with tools for engaging the head of uncommon shape provided on the threaded fastener 38A of the override member 38, either the first or second providers of telephone line signals may unfasten the override member from the base tab 39 and then open the subscriber cover while the subscriber cover, and in particular the tab 39A, remain fastened to the override member 38 by the padlock P as shown in FIGS. 1 and 3. Thereafter, either the first or second provider of subscriber service signals will have access to the subscriber compartment 30 and the first provider may unfasten the first provider cover 18 and the second provider cover 20 to gain access to the first and second provider compartments 31 and 32 and/or the second provider of telephone line signals may unfasten the second provider cover 20 to gain access to the second provider compartment 32.

Referring particularly to the preferred embodiment shown in FIGS. 1 and 2, up to six individual subscriber line modules 60 may be mounted in the compartment 30. In particular, such individual subscriber line module, or modules, 60 may be mounted to the bottom 22 of the housing 14 in the same manner that the module 10 of the '199 patent is described as being suitably mounted to the bottom of telephone network interface apparatus disclosed in the '199 patent and as described in the '199 patent at Column 6, line 45, to Column 7, line 22. It will be understood that the individual subscriber line modules 60 may be, for example, the same, or substantially the same, as the individual subscriber line module 91 shown in FIGS. 7–10 and FIGS. 12–17, or individual subscriber line module 91A shown in FIGS. 19 and 20, or the individual subscriber line module 91B shown in FIGS. 22 and 23, of the '209 patent. Alternatively, subscriber line module, or modules, 60, may be the same, or substantially the same, as the individual subscriber line module 10 shown in the '199 patent. Generally, it will be understood, and as described in detail in the '209 patent and the '199 patent, and as illustrated in FIG. 5 of the '199 patent, with regard to the telephone subscriber premises line 12, incoming telephone line 14 and module 10, the individual subscriber line module, or modules, 60 are for interconnecting a telephone subscriber premises line with an incoming telephone line. Although not shown in FIGS. 1–6 herein, it will be understood that extending outwardly from the individual subscriber line module, or modules, 60, are a pair of conductors connected to contacts in a jack, also not shown in these FIGS., but which jack is provided in each individual subscriber line module 60, and which conductors are the same as the conductors 50 extending outwardly of the individual subscriber line module 10 shown in FIG. 5 of the '199 patent, or the pair of conductors 50 connected to contacts in the jack 40 shown in FIG. 7 of the '199 patent, or the pair of conductors 107 connected to the contacts of the jack 105 and extending out of the individual subscriber line module 91 shown in FIGS. 7–10 of the '209 patent. Accordingly, it will be understood that in the apparatus 10 of the present invention, FIG. 1, one to six telephone subscriber premises lines or a multiple line telephone cable, not shown, may be inserted into the compartment 30 through the grommet 62 and connected, respectively, to the individual subscriber line modules 60 in the manner described in detail in the '209 patent and the '199 patent.

Mounted in the first provider compartment 31, FIGS. 1 and 2, are one or more pairs of overvoltage or voltage surge protectors 64 of the type known to the art, and in the invention apparatus embodiment shown in these FIGS., six pairs of such overvoltage protectors 64 are included. Also mounted in the compartment 31 is a suitable ground buss or ground bar 66 of the type known to the art for being connected to earth ground by a suitable ground connecting conductor (not shown) and which conductor is connected to the ground buss or bar 66 by the stud 92. The ground buss or ground bar 66 may be mounted to the housing bottom 22 such as, for example, by screws, one of which is shown in FIG. 2. More particularly, in the manner known to the art, the pairs of overvoltage protectors 64 are mounted and electrically connected to the ground buss or ground bar 66 by suitable threaded nuts and bolts such as indicated by numerical designations 67 in FIG. 1. The pairs of overvoltage protectors 64 provide respective pairs of telephone terminals 69. One to six incoming telephone lines or a multiple telephone cable (not shown) carrying telephone line signals, from a first provider of such telephone line signals, are inserted into the compartment 31 through the grommet 68 and are suitably connected to the respective pairs of telephone terminals 69 in the manner known to the art.

Mounted in the second provider compartment 32, FIGS. 1–4, is a telephone terminal or connector block indicated by general numerical designation 70, of the type known to the art, and which includes an insulating block 72 providing a plurality of pairs of telephone terminals 74, six pairs of such telephone terminals 74 being shown in the invention embodiment shown in these FIGS; the terminal or block 70 may be mounted to the bottom 22 such as by the screws S. One to six incoming telephone lines (not shown) carrying telephone line signals, from a second provider of such telephone line signals, are inserted into the second provider compartment 32 through the grommet 76 and are suitably connected to the telephone terminals 74 in the manner known to the art.

Figure 6:
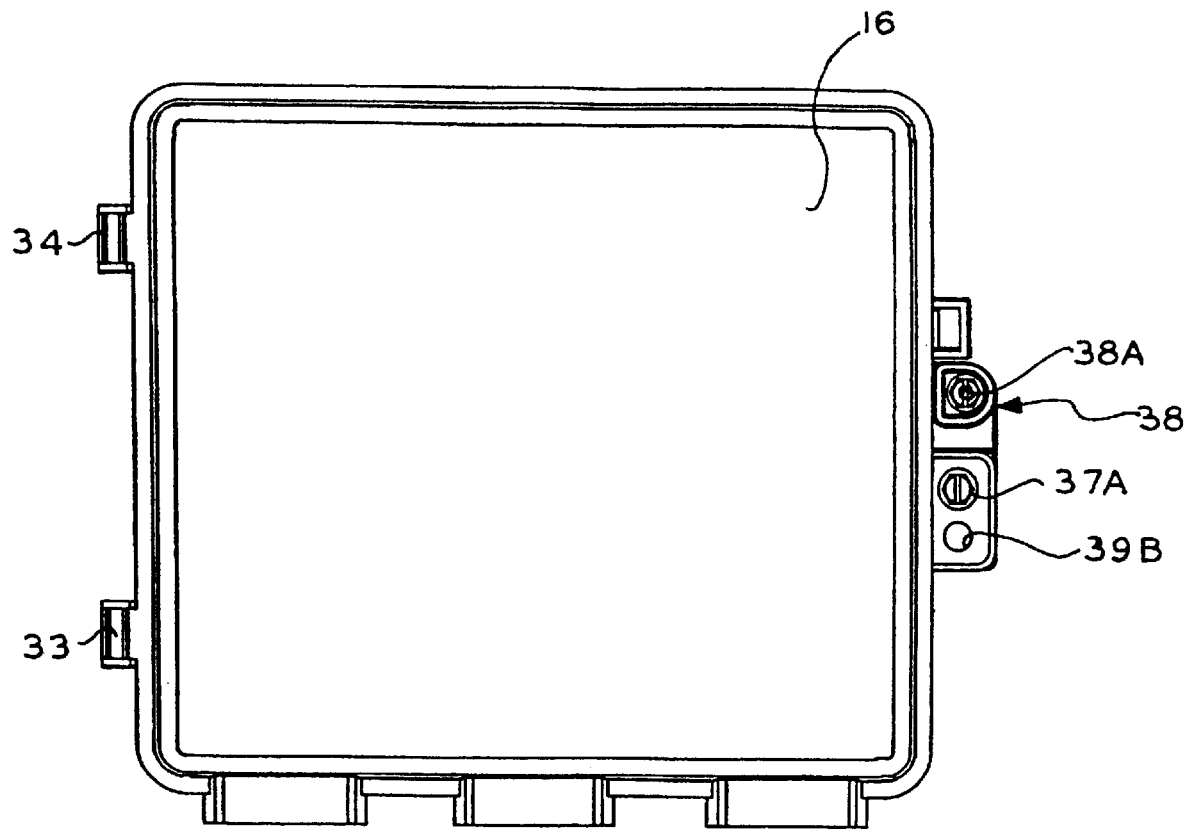
FIG. 6 is a front or top view of the first apparatus embodiment of the present invention showing an outer door fastened closed over two inner doors.

Referring now to diagrammatical illustrations 7 and 8 and first to FIG. 7, a description of the interconnections provided by the present invention between a single telephone subscriber premises line and either a single incoming telephone line from a first provider of telephone line signals or a single incoming telephone line from a second provider of telephone line signals will be described. It will be presumed that a telephone subscriber has unfastened the cover 16 as described above and raised the cover to the position shown in FIG. 5. The telephone subscriber thereafter inserts his or her telephone subscriber premises line 80 (FIGS. 7 and 8) into the subscriber compartment 30 and connects the line 80 to an individual subscriber line module 60 in the manner referred to generally above and as described and shown in detail in the '209 and '199 patents. A pair of conductors 82, FIGS. 7 and 8, of the type described above, connected to contacts (not shown) in the jack 83 provided in the individual subscriber line module 60 extend outwardly from the module 60 across and through indentations provided in the individual subscriber line module mounting member 24 and which indentations are shown particularly in FIG. 2. Thereafter, the subscriber will refasten the cover 16 to the override member 38, as shown in FIG. 6, and thereby to the base 14 as described above. It will be further assumed that such subscriber has chosen to receive telephone line signals from a first provider of telephone line signals who will be associated with the first provider compartment 31, FIGS. 1 and 2. The first provider of telephone line signals will unfasten the covers 16, 18 and 20 as described above and will open the covers to the open positions shown in FIGS. 1 and 2. Thereafter, and referring again to FIG. 7, the first provider of telephone line signals will insert its incoming telephone line 84 into the first provider compartment 31 and will connect or terminate the incoming telephone line 84 to the pair of representative telephone terminals 69A in a manner known to the art, telephone terminals 69A being provided on pair of representative overvoltage protectors 64A. The first provider of telephone line signals will thereafter provide and utilize a jumper telephone line or pair of conductors 86 to interconnect the conductors 86, in the manner known to the art, to the telephone representative terminals 69A in the first provider compartment 31 and to a pair of representative telephone terminals 74A provided on the terminal block 70 in second provider compartment 32; the jumper telephone line 86 will be inserted in or extended through one of the indentations 27 provided in the separating member 26. Thereafter, the first provider of telephone signals will connect the conductors 82 extending outwardly from the subscriber line module 60 to the representative telephone terminals 74A in the manner known to the art, and the incoming telephone line 84 from the first provider of telephone line signals will be interconnected to the telephone subscriber premises line 80 through the jumper telephone line or conductors 86, the representative telephone terminals 78A, the conductors 82, and the individual subscriber line module 60 upon, for example, the plug 101 shown in FIGS. 8 and 10 of the '209 patent being plugged into the jack 83 shown in dotted outline in FIG. 7 herein. Thereafter, the first provider of telephone signals will close the covers 18 and 19 over the respective first and second provider compartments 31 and 32, will fasten the first provider cover to the base 14 as described above and will fasten the second provider cover 18 to the second provider cover 20 as described above and will thereafter close the subscriber cover 16 and the subscriber compartment 3 and open the second provider cover 20 and the first provider cover 18 and will fasten the subscriber cover 16 to the base 14 through the override member 38 as also described above.

Thereafter, it will be presumed that the telephone subscriber has chosen to discontinue receiving telephone line signals from the first provider of telephone signals and desires to receive telephone line signals from a second provider of telephone line signal associated with second provider compartment 32, FIGS. 1 and 2. The second provider of telephone line signals will unfasten the subscriber cover 16 as described above, using the override member 38 if required, and will open the subscriber cover to the position shown in FIG. 5; thereafter, the second provider will unfasten the second provider cover 20 from the first provider cover 18 as described above and will then open the second provider cover into its open positions shown in FIGS. 3 and 4. Thereafter, and referring now to the diagrammatic illustration of FIG. 8, the second provider of telephone line signals will insert its incoming telephone line 90 into the second provider compartment 32 and, in the manner known to the art, will connect or terminate the incoming telephone line 90 to the pair of representative telephone terminals 74B provided on the connector or terminal block 70 mounted in the compartment 32. Thereafter, the second provider of telephone line signals will disconnect the conductors 82 (extending from the subscriber line module 60) from the pair of representative telephone terminals 74A, FIG. 7, and will reconnect the conductors 82 to the pair of representative telephone terminals 74B, in the manner known to the art, thereby interconnecting the incoming telephone line 90 from the second provider of telephone line signals to the telephone subscriber premises line 80 through the pair of telephone terminals 74B, the conductors 82 and the subscriber line module 60 whereby the telephone subscriber will now receive telephone line signals from the second provider of telephone line signals. Thereafter, the second provider of telephone line signals will close the second provider door 20 over the second provider compartment 32 and will fasten the provider door 20 to the first provider door 18 as described above, and close the subscriber door 16 over the subscriber compartment 30 and over the doors 20 and 18 and will fasten the door 16 to the override member 38 as described above.

Figure 7:
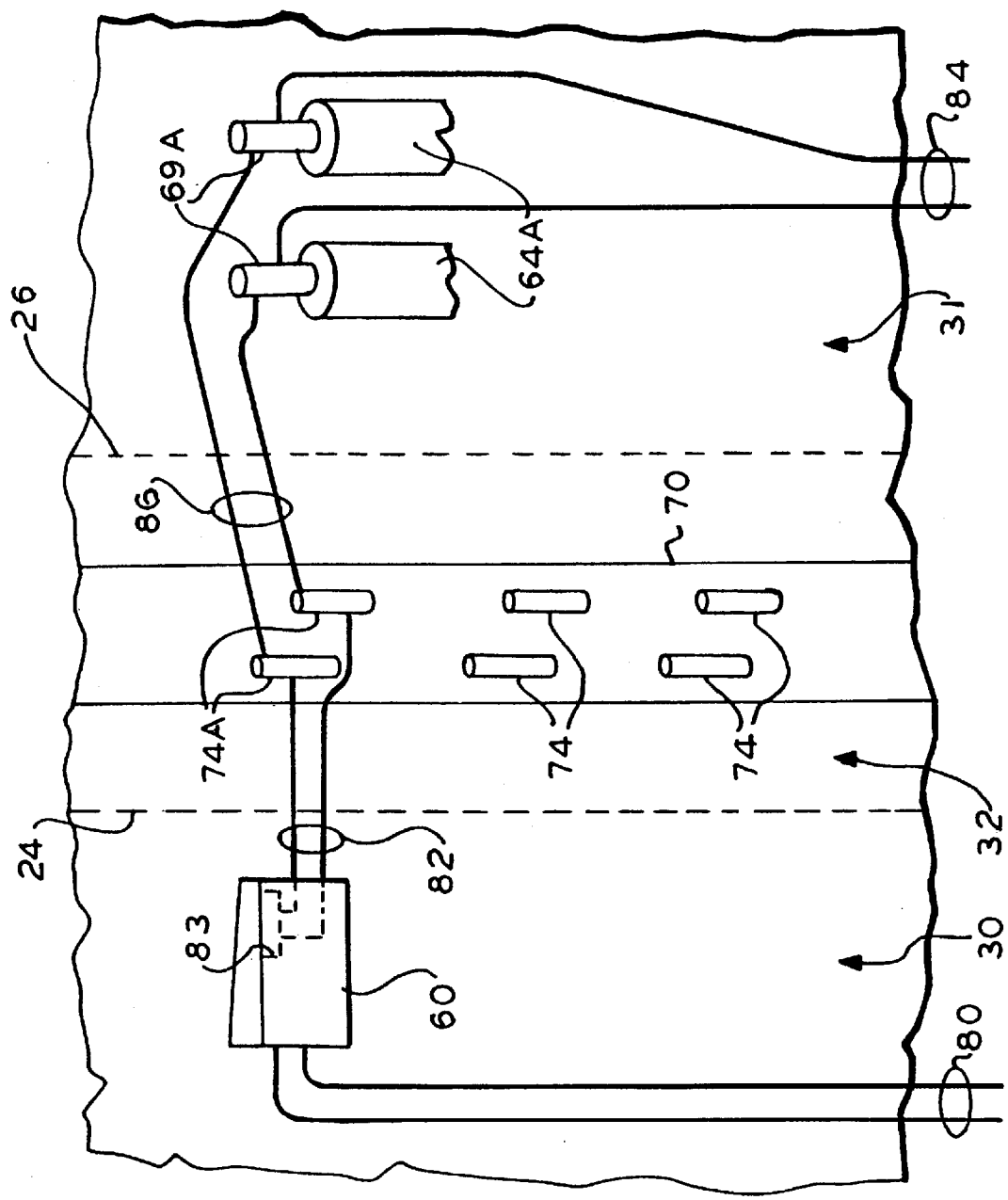
FIGS. 7 and 8 are partial diagrammatical illustrations illustrating the interconnection of a telephone subscriber premises line to either one of two incoming telephone service lines from two providers of telephone line signals.
Figure 8:
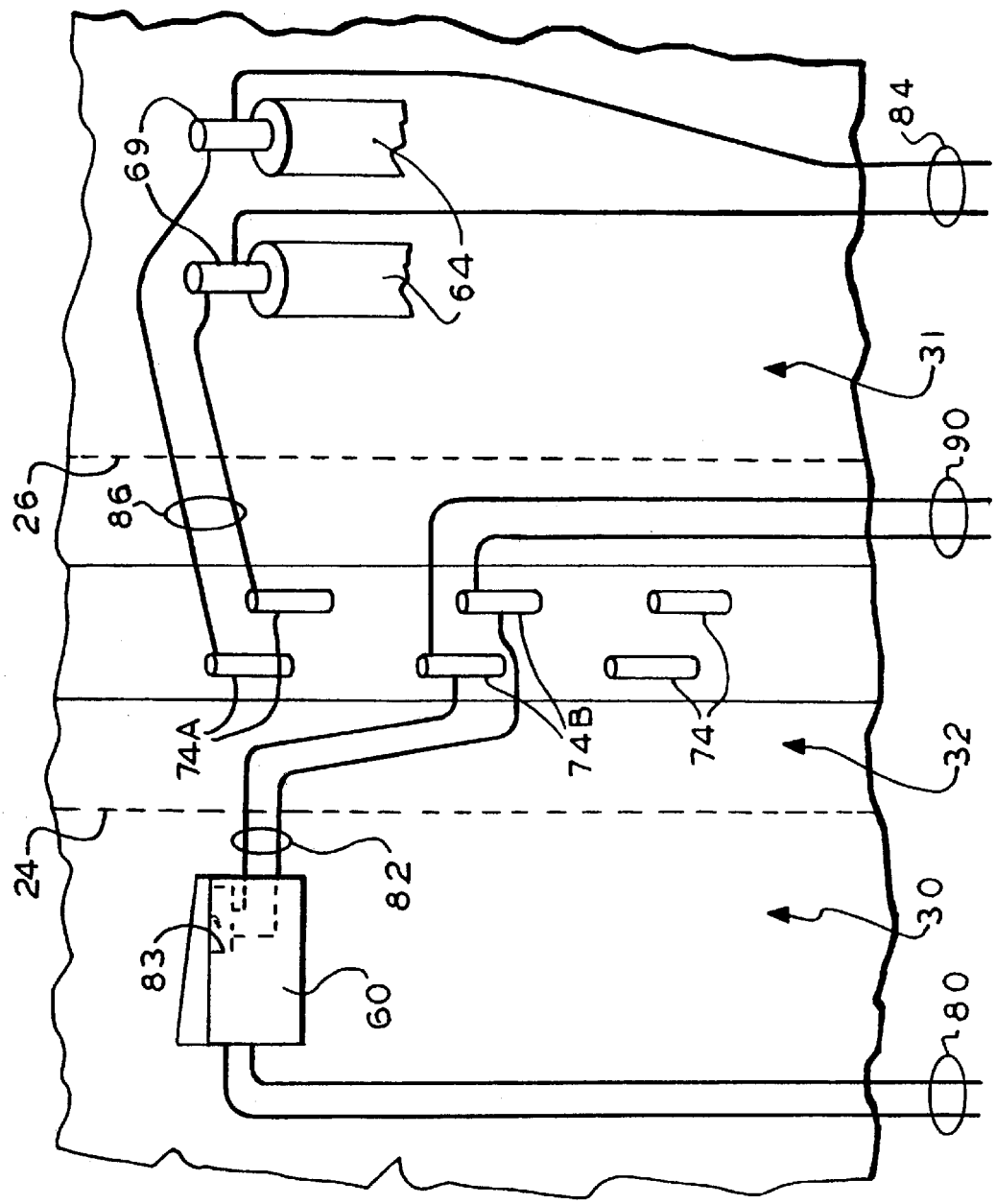

Alternatively, instead of utilizing the telephone terminals 74B shown in FIG. 8 to interconnect the second provider's incoming telephone line 90 to the subscriber premises line 80, and referring to FIG. 7, the second provider of incoming telephone line signals may disconnect the telephone jumper or conductors 86 from the representative telephone terminals 74A to which the conductors 82 are connected, then connect its incoming telephone line 90 (FIG. 8) to the representative telephone terminals 74A to provide telephone line signals from the second provider thereof to the telephone subscriber.

Thereafter, if the subscriber chooses to discontinue receiving subscriber service signals from the second provider, the first provider of subscriber service signals may reverse the disconnection and interconnection steps taken by the second provider and reconnect the incoming telephone line from the first provider to the subscriber premises line.

Since in this embodiment no ground connection is provided in second provider compartment 32, note FIGS. 1 and 2, for the pairs of telephone terminals 74, the incoming telephone or telephone lines from a second provider of telephone line signals, whose telephone lines are inserted into compartment 32, typically will come from apparatus referred to in the art as a smart NID or active NID apparatus such as are available from Motorola under the name CABLE ACCESS UNIT, Motorola Multi-Media Group, 1475 W. Shure Drive, Arlington Heights, Ill. 60004 and available from Northern Telecom under the name CORNERSTONE, Northern Telecom, P.O. Box 13010, Research Triangle Park, N.C. 27709. As is further known to those skilled in the art such smart NID or active NID typically receive broadband signals including telephone signals and separate out the telephone signals and transmit them over telephone lines such as the telephone line 90 shown in FIG. 8. As is still further known to those skilled in the art, such smart block or smart block telephone network interface apparatus is provided with its own grounding means and overvoltage protection whereby a telephone line coming from such smart block or smart block telephone network interface apparatus is provided with overvoltage protection and associated grounding means.

It will be further understood that, and in accordance with the teachings of the present invention, the second provider of telephone line signals does not have access to the first provider compartment 31 associated with the first provider of telephone signals and that the door 18 remained closed and fastened over the compartment 31 while the second provider of telephone line signals was disconnecting the telephone jumper lines or conductors 86 from the telephone terminals 74A as described above with regard to FIG. 7 or was disconnecting the conductors 82 from the telephone terminal 74A and connecting the conductors 82 to the telephone terminal 74B as described above in connection with FIG. 8 and was connecting its incoming telephone line 90, FIG. 8, to the telephone premises line 80 as described above with regard to FIGS. 7 and 8. Further, while the second provider of telephone line signals was making its interconnection with the telephone subscriber line 80, the ground member or buss 66 mounted in the first provider compartment 31, FIGS. 1 and 2, remained connected to earth ground so as to permit the overvoltage protectors 64, FIGS. 1 and 2, to remain ready to divert voltage surges present on the incoming telephone line 84 of the first provider of telephone signals, FIG. 7, while and after the second provider of telephone line signals was interconnecting its incoming telephone line 90 to the telephone subscriber premises line 80. Further, since the second provider does not have access to the first provider compartment 31, the second provider cannot intentionally or inadvertently disconnect the overvoltage protector 64 (FIGS. 1 and 2) from the ground buss or bar 66 and cannot intentionally or inadvertently disconnect the ground connecting wire or conductor (not shown) from the ground connector stud 66A and therefore so long as the first provider cover 18 remains fastened to the base 14 the connection of the overvoltage protector 64 to earth ground remains in place at all times.

Figure 9:
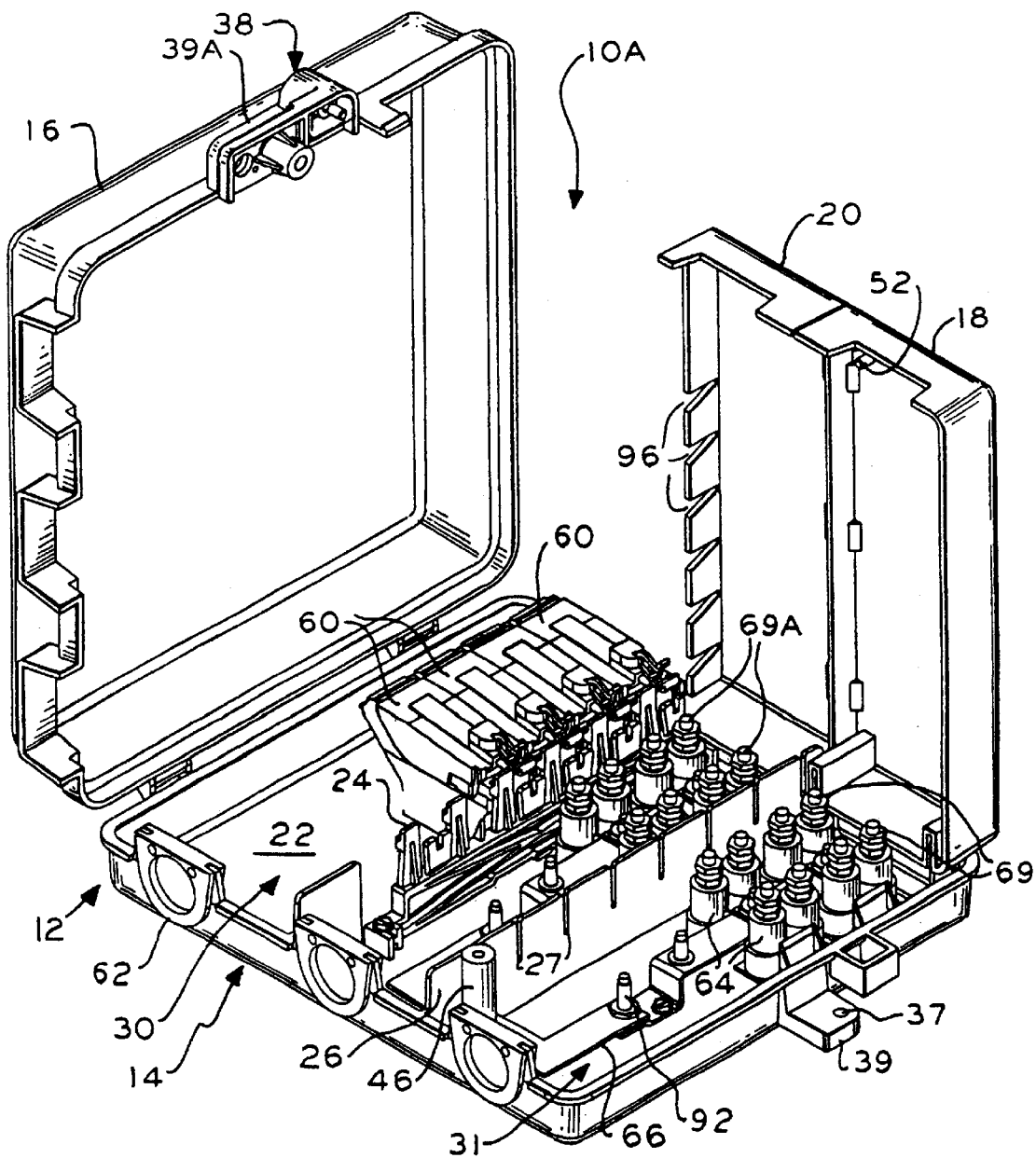
FIG. 9 is a perspective view of an alternate apparatus embodiment of the present invention.
Figure 10:
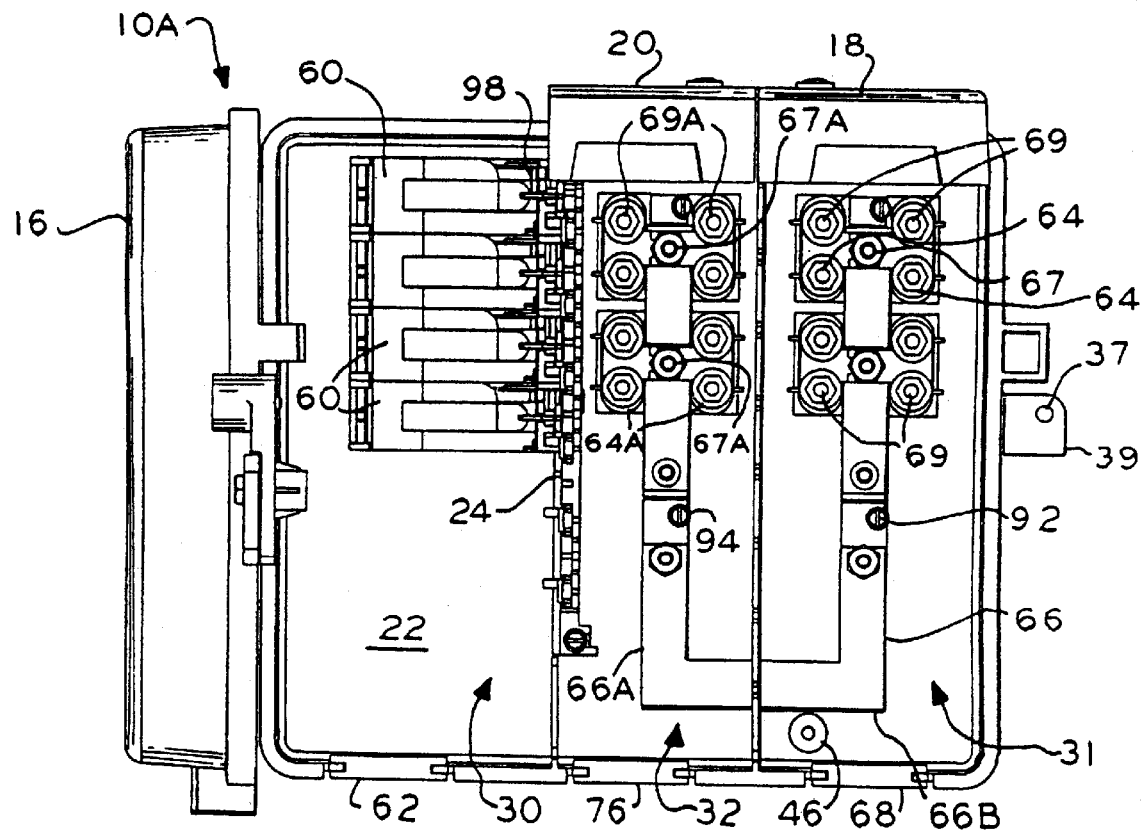
FIG. 10 is a top or front view of the alternate apparatus embodiment of the present invention shown in FIG. 9.

Referring now to FIGS. 9 and 10, it will be generally understood that apparatus 10A, except as described in detail below, is generally the same as apparatus 10 of FIGS. 1–6 and the structural elements comprising apparatus 10A which are the same as the structural elements of apparatus 10 are given the same numerical designations and perform the same functions as described above. Instead of having the terminal or connector block 70 mounted in the second provider compartment 32 as in apparatus 10 of FIGS. 1–6, in apparatus 10A, FIGS. 9 and 10, four pairs of overvoltage protectors 64A and four pairs of telephone terminals 69 are mounted in the second provider compartment 32, and in this embodiment four pairs of overvoltage protectors 64 and four pairs of telephone terminals 69 are mounted in the first provider compartment 31. Also mounted in the second provider compartment 32 is a suitable ground buss or ground bar 66A, FIG. 10, of the type known to the art. It will be understood from FIG. 10 that the ground buss or ground bar 66A mounted in second provider compartment 32 and the ground buss or ground bar 66 mounted in first provider compartment 31 are connected in common by the ground buss or ground bar portion 66B which extends under the compartment separating member 26, The ground buss or ground bar 66A may be mounted to the housing bottom 22 such as, for example, by screws, one of which is shown in FIG. 10. More particularly, and in the manner known to the art, the pairs of overvoltage protectors 64A are mounted and electrically connected to the ground buss or ground bar 66A in the second provider compartment 32 by suitable threaded nuts and bolts such as indicated by general numerical designation 67A in FIG. 10. The pairs of overvoltage protectors 64A provide pairs of telephone terminals 69A. One to four incoming telephone lines (not shown) carrying telephone line signals, from a second provider of such telephone line signals, are inserted into the compartment 32 through the grommet 78 and are suitably connected to the respective telephone terminals 69A in the manner known to the art.

Generally, it will be understood that apparatus embodiment 10A, of FIGS. 9 and 10, functions in substantially the same manner as apparatus invention embodiment 10 for connecting the telephone subscriber premises line 80, FIGS. 7 and 8, to an incoming telephone line from a first provider of incoming telephone line signals or to the telephone line of a second provider of incoming telephone line signals as taught above with regard to FIGS. 7 and 8. Further, generally, it will be understood that the pairs of telephone terminals 69A, of apparatus embodiment 10A of FIGS. 9 and 10, replace the pairs of telephone terminals 74 shown in FIGS. 1–4 and perform the interconnect functions of the pairs of telephone terminals 74A and 74B shown in FIGS. 7 and 8 and described above.

Referring again to FIG. 10, and to apparatus embodiment 10A, it will be understood that the commonly connected ground busses or ground bars 66 and 68A, upon being connected to earth ground by a suitable grounding conductor (not shown) connected to either grounding studs 92 or 94, assure that incoming telephone lines connected to the pairs of telephone terminals 64 in compartment 31 and incoming telephone lines connected to telephone terminals 69A in compartment 32 remain protected against overvoltage surges because their associated overvoltage protectors remain connected to earth ground while either the first provider of incoming telephone line signals or the second provider of incoming telephone line signals are connecting their respective incoming telephone lines to the subscriber premises line as taught above, or either provider is disconnecting the telephone line of the other provider from the subscriber premises line before connecting its telephone line to the subscriber premises line.

Figure 16:
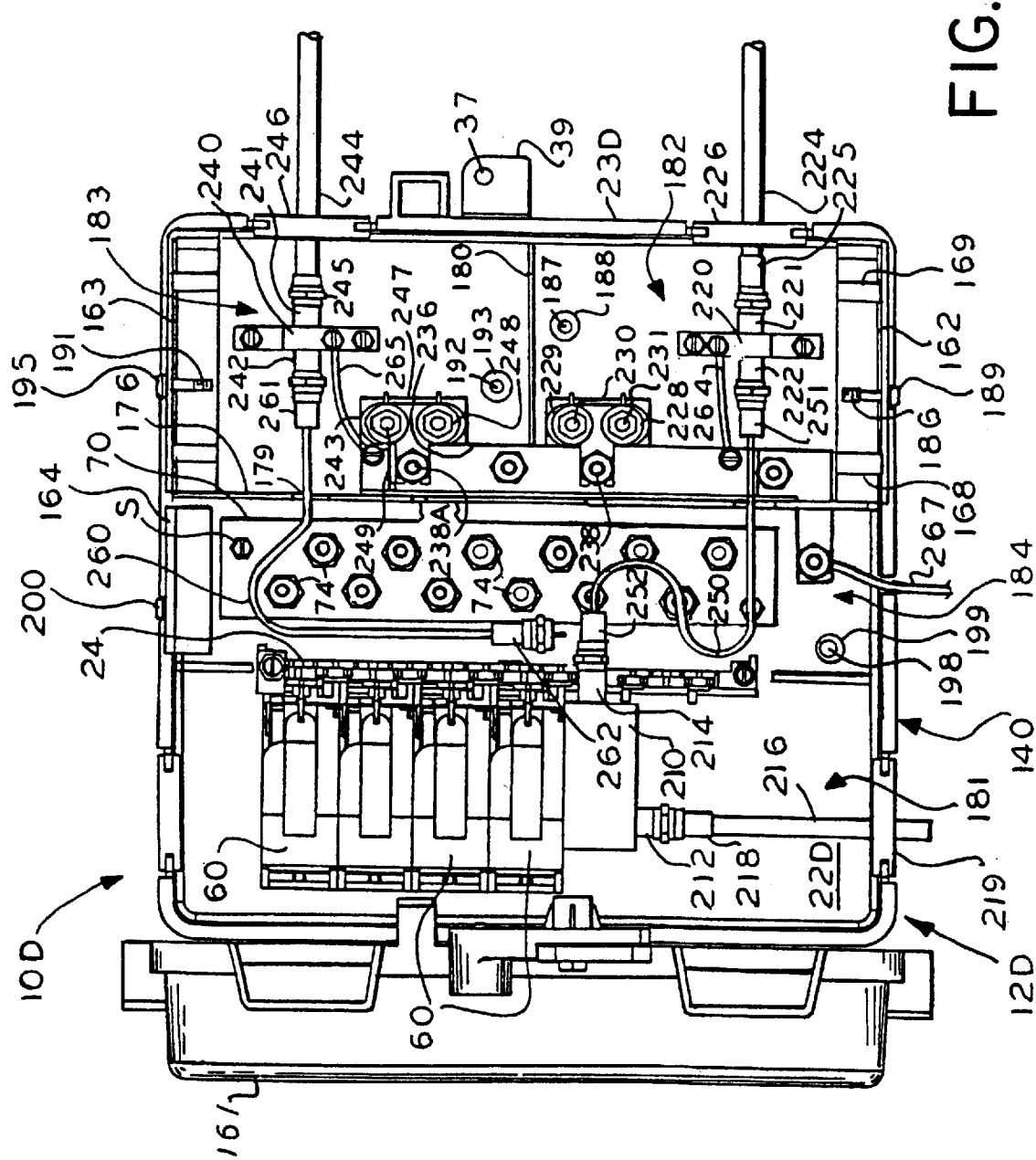

Referring again to FIGS. 3 and 9, it will be noted that the second provider cover 20 is provided with a plurality of inwardly extending slots 96 which perform the same function as the plurality of inwardly extending slots 171 . . . 176, FIG. 6 of the '209 patent, for receiving a portion of a security staple 98 for permitting a telephone subscriber to padlock a security cover of the individual subscriber line modules 60 in the same manner as taught in the '209 patent with regard to the padlock 148 shown in FIG. 16 of the '209 patent.

Referring again generally to the invention embodiment shown in FIGS. 1–6 and illustrated diagrammatically in FIGS. 7 and 8, and referring in particular to FIG. 1, it will be understood that up to six telephone subscriber premises lines, or a multi-conductor subscriber telephone cable including up to six telephone subscriber premises lines, may be inserted into the subscriber compartment 30 and the telephone subscriber premises lines may be connected respectively to the six individual subscriber line modules 60 shown mounted in the subscriber compartment 30. It will be further understood that up to six incoming telephone lines, or a multi-telephone line cable including at least six incoming telephone lines, may be inserted into the first provider compartment 32 and the up to six incoming telephone lines may be connected respectively to the six pairs of telephone terminals 69 shown in first provider compartment 31. Further, up to six incoming telephone lines, or a multi-line telephone cable including at least six incoming telephone lines, may be inserted into the second provider compartment 32 and up to six incoming telephone lines from the second provider may be connected respectively to the six pairs of telephone terminals 74 shown mounted in second provider compartment 32. Thereafter, any one of the up to six incoming telephone lines from the first provider may be connected to any one of the telephone subscriber premises lines connected to the six individual subscriber line modules 60 mounted in the subscriber compartment 30 using jumper telephone lines 86 (FIG. 7) and the pairs of telephone terminals 74 provided on the terminal block 72 mounted in the second provider compartment 32. Further, the second provider, if chosen by any of the subscribers associated with any one of the six individual subscriber line modules 60 mounted in the subscriber compartment 30, can disconnect any one of the incoming telephone lines of the first provider which may be connected to the telephone terminals 74 in the second provider compartment and thereafter the second provider may connect any one of its up to six incoming telephone lines to any one of the subscriber premises lines connected to any one of the six individual subscriber line modules 60 as described above; similarly with regard to the invention embodiment shown in FIGS. 9 and 10 and with regard to the four pairs of telephone terminals 69 mounted in the first provider compartment 30 of FIGS. 9 and 10, for the four pairs of telephone terminals 69A mounted in the second provider compartment 32 and for four of the individual subscriber line modules 60 shown mounted in the subscriber compartment 30.

Referring now to the invention embodiment shown in FIGS. 11 and 12, it will be noted that apparatus 10B of this invention embodiment is similar to the apparatus embodiment 10A shown in FIGS. 9 and 10 and described above in that the invention embodiment of FIGS. 11 and 12 includes the four individual subscriber line modules 60 mounted in the subscriber compartment 30, the four pairs of telephone terminals 69 mounted in the first provider compartment 31, the four pairs of telephone terminals 69A mounted in the second provider compartment 32 and the commonly connected ground bars or busses 66 and 66A for, as taught in detail above, permitting any one of the four telephone subscribers to receive incoming telephone line signals from either of two providers of such telephone line signals while overvoltage protection is continuously provided. It will be understood that structural elements comprising apparatus 10B which are the same as the structural elements of apparatus 10 and 10A are given the same numerical designations and perform the same functions as described above. It will be further noted that the invention embodiment of FIGS. 11 and 12, apparatus 10B, differs from apparatus 10A shown in FIGS. 9 and 10 in that the apparatus 10B shown in these FIGS. also includes apparatus for permitting a subscriber to receive broadband signals from either of two providers thereof as chosen by the subscriber, or viewed differently, permits either of two providers of broadband signals, as chosen by the subscriber, to connect their incoming coaxial cables to a coaxial cable extending to the subscriber's broadband receiving apparatus such as, for example, a television set upon the broadband signals being, or including, cable television signals.

Figure 11:
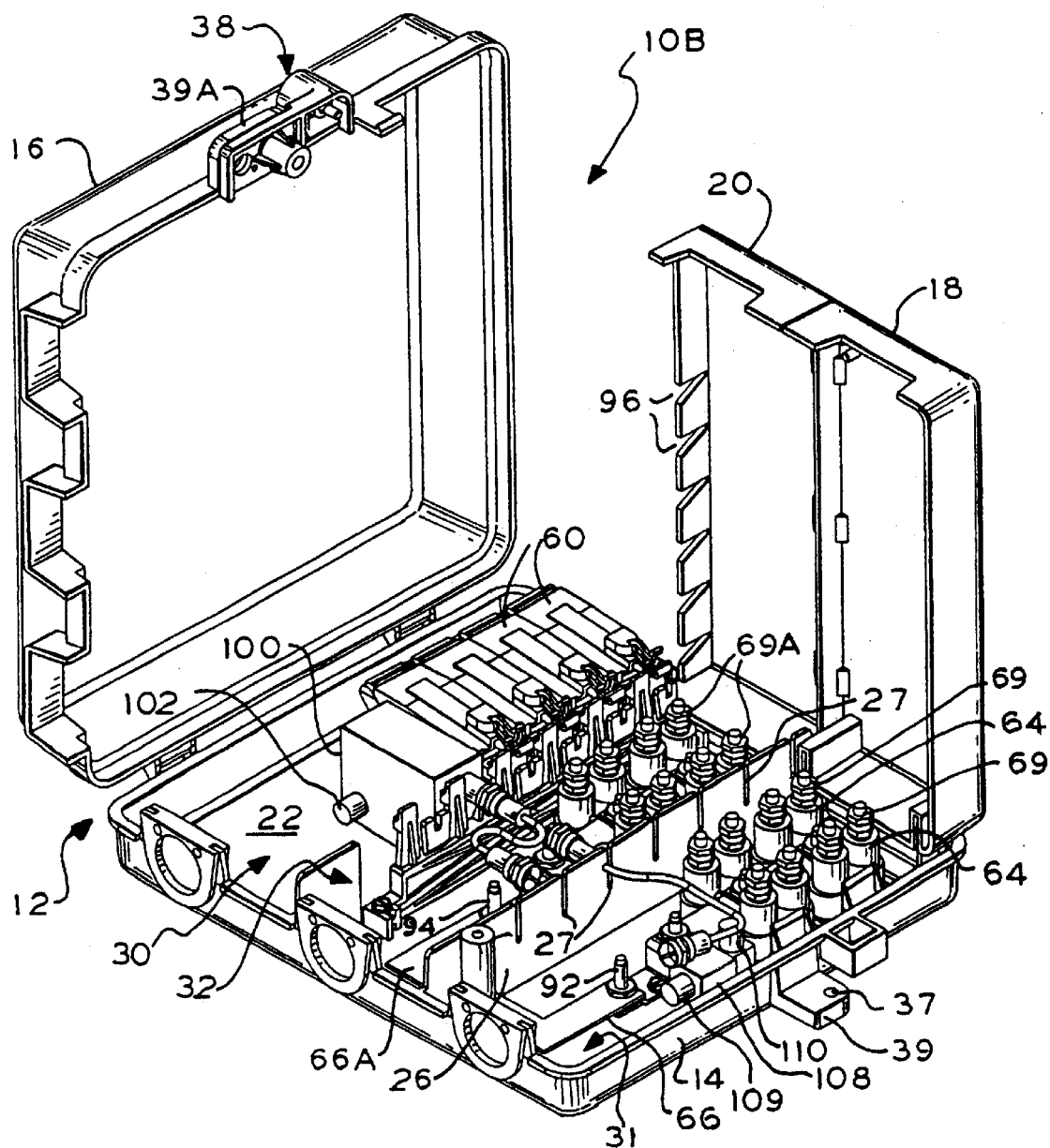
FIG. 11 is a top or front perspective view of a further embodiment of the present invention for connecting either of two incoming telephone lines to a telephone subscriber premises line and for connecting either of two incoming coaxial cables from either of two providers of broadband signals, such as cable television signals, to a subscriber's coaxial cable connected to the subscriber's television set.
Figure 12:
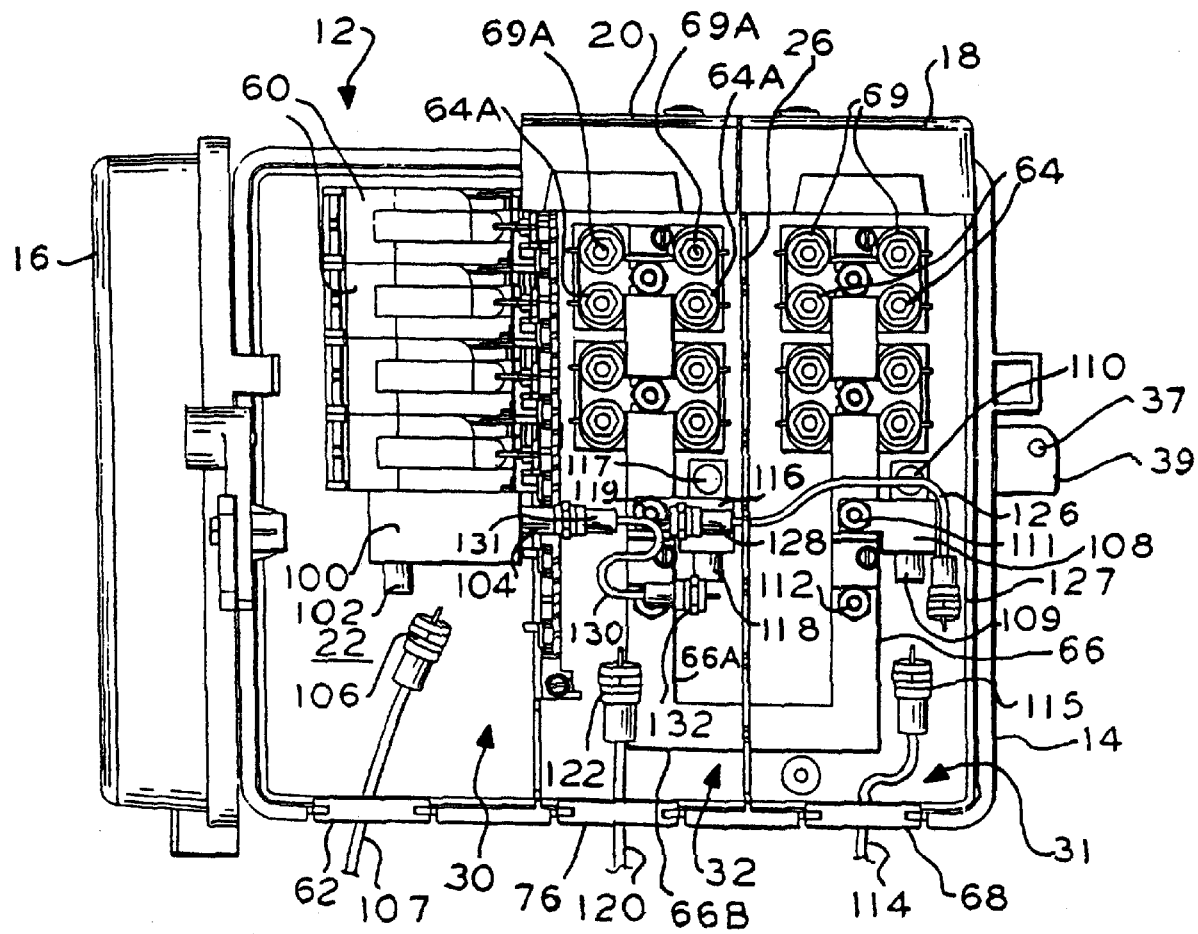
FIG. 12 is a top view of FIG. 11.

More particularly, apparatus 10B of FIGS. 11 and 12 includes a first, or subscriber, coaxial cable connector 100, of the type known to the art, mounted suitably in the subscriber compartment 30 and including interconnected pair of female coaxial cable connectors 102 and 104. The female connector 102, FIG. 12, is for being connected to the male connector 106 provided at the end of the subscriber coaxial cable 107 extending through the grommet 62 into the subscriber compartment 30. The subscriber coaxial cable 107 is for being connected to the subscriber apparatus for receiving broadband signals such as, for example and noted above, the subscriber's television set for receiving broadband cable television signals.

Mounted in the first provider compartment 31 is a second, or first provider, coaxial cable connector 108 of the type known to the art including two interconnected female coaxial cable connectors 109 and 110 disposed at 90° with respect to each other as may be best seen in FIG. 11. The coaxial cable connector 108 is mounted suitably to the base bottom 22 and is connected to the ground buss 66 by suitable nuts and bolts 111 and 112. A coaxial cable 114, FIG. 12, carrying broadband signals from a first provider of broadband signals extends into the first provider compartment 31 through the grommet 68 and is provided with a male coaxial cable connector 115 for being connected to the female coaxial cable connector 109 of the coaxial cable connector 108.

A third, or second provider, coaxial cable connector 116 (FIG. 12), of the type known to the art, includes a pair of interconnected female coaxial cable connectors 117 and 118 and is mounted suitably to the base bottom 22 by suitable means (not shown) and is connected to the ground buss 66A by the nut and bolt indicated by numerical designation 119; the connectors 117 and 118 are disposed 90° with respect to each other. A coaxial cable 120 carrying broadband signals from a second provider of broadband signals extends into the second provider compartment 32 through the grommet 76 and is provided with a male coaxial cable connector 122 for being connected to the female coaxial cable connector 118.

It will be further understood that apparatus 10B includes the base 14, subscriber cover 16, first provider cover 18 and second provider cover 20 as described above in connection with the earlier embodiments and that the subscriber cover 16 and first provider cover 18 are fastened to the base 12 as described above and that the second provider cover 20 is fastened to the first provider cover 18 as described above, and that the override means 38 also are included in this embodiment.

Referring primarily to FIG. 12, it will be presumed that a subscriber associated with the subscriber coaxial cable 107, has unfastened and opened the subscriber cover 16 to the position shown in FIG. 5 in the manner described above, has inserted the subscriber coaxial cable 107 through the grommet 62 and has connected the male coaxial cable 106 to the female coaxial cable connector 102 and has chosen to receive broadband signals from the first provider of broadband signals. Accordingly, the first provider of broadband signals will open the covers 16, 18 and 20 as described above, will insert the coaxial cable 114 into the first provider compartment 31 and connect the male coaxial cable connector 115 to the female coaxial cable connector 109 provided on the first provider coaxial cable connector 108, and will provide and utilize a jumper coaxial cable 126 provided at its opposite ends with male coaxial cable connectors 127 and 128 to interconnect the female coaxial cable connector 110 provided on the first provider coaxial cable connector 108 and the female coaxial cable connector 104 provided on the subscriber coaxial cable connector 100; the first provider jumper coaxial cable 126 extends through one of the indentations 27 (FIG. 11) provided in the compartment separating wall 26. Thereafter, the first provider will close and refasten the covers 16, 18 and 20 as described above and the subscriber will receive broadband signals from the first provider thereof.

It next will be presumed that the subscriber has decided to discontinue the receipt of broadband signals from the first provider of broadband signals and desires to receive broadband signals from the second provider of broadband signals associated with the second provider compartment 32. Accordingly, as described above, the second provider of broadband signals will open the subscriber cover 16 and the second provider cover 20, to the positions shown therefor in FIGS. 3 and 4 and as described above, and will disconnect the male coaxial cable connector 128 (FIG. 12) provided on the first provider's jumper coaxial cable 110 from the subscriber's coaxial cable connector 104 and thereafter will provide and utilize jumper coaxial cable 130 provided at its opposite ends with male coaxial cable connectors 131 and 132 to interconnect the female coaxial cable connector 117 provided on the second provider coaxial cable connector 116 and the female coaxial cable connector 104 provided on the subscriber coaxial cable connector 110 whereby the subscriber thereafter will receive broadband signals from the second provider of broadband signals over the subscriber coaxial cable 107. Thereafter, the second provider of broadband signals to the subscriber will reclose and refasten the second provider cover 20 and the subscriber cover 16 as described above. Were the subscriber to decide to discontinue receipt of broadband signals from the second provider thereof and decide to again receive broadband signals from the first provider thereof, the first provider would reopen the covers as described above, would disconnect the second provider jumper coaxial cable 130 and reconnect the first provider's jumper coaxial cable 110 as described above.

Although not shown in FIGS. 11 and 12, it will be understood that incoming telephone lines from first and second providers of telephone line signals may be inserted respectively into the first and second provider compartments 31 and 32 and connected respectively to the first and second sets of telephone terminals 69 and 69A whereby the subscribers associated with the individual subscriber line module 60 may receive incoming telephone line signals from either the first or second provider of such signals in the manner described above with regard to the embodiment of the invention shown in FIGS. 1–6 and illustrated diagrammatically in FIGS. 7 and 8. It will be further understood, in accordance with the teachings of the present invention, that while interconnections are being made and changed between the individual subscriber line modules and the incoming telephone lines from the first and second providers of telephone line signals and interconnections are being made and changed between the incoming broadband signals provided by the first and second providers of broadband signals as described above, the pairs of overvoltage protectors 64 mounted in the first provider compartment 31, the pairs of overvoltage protectors 64A mounted in the second provider compartment 32, the first provider coaxial cable connector 108 and the second provider coaxial cable connector 116 remain connected to earth ground at all times through the ground bars or busses 66, 66A and interconnecting portion 66B upon either of the studs 92 or 94 (FIG. 11), not shown.

Figure 13:
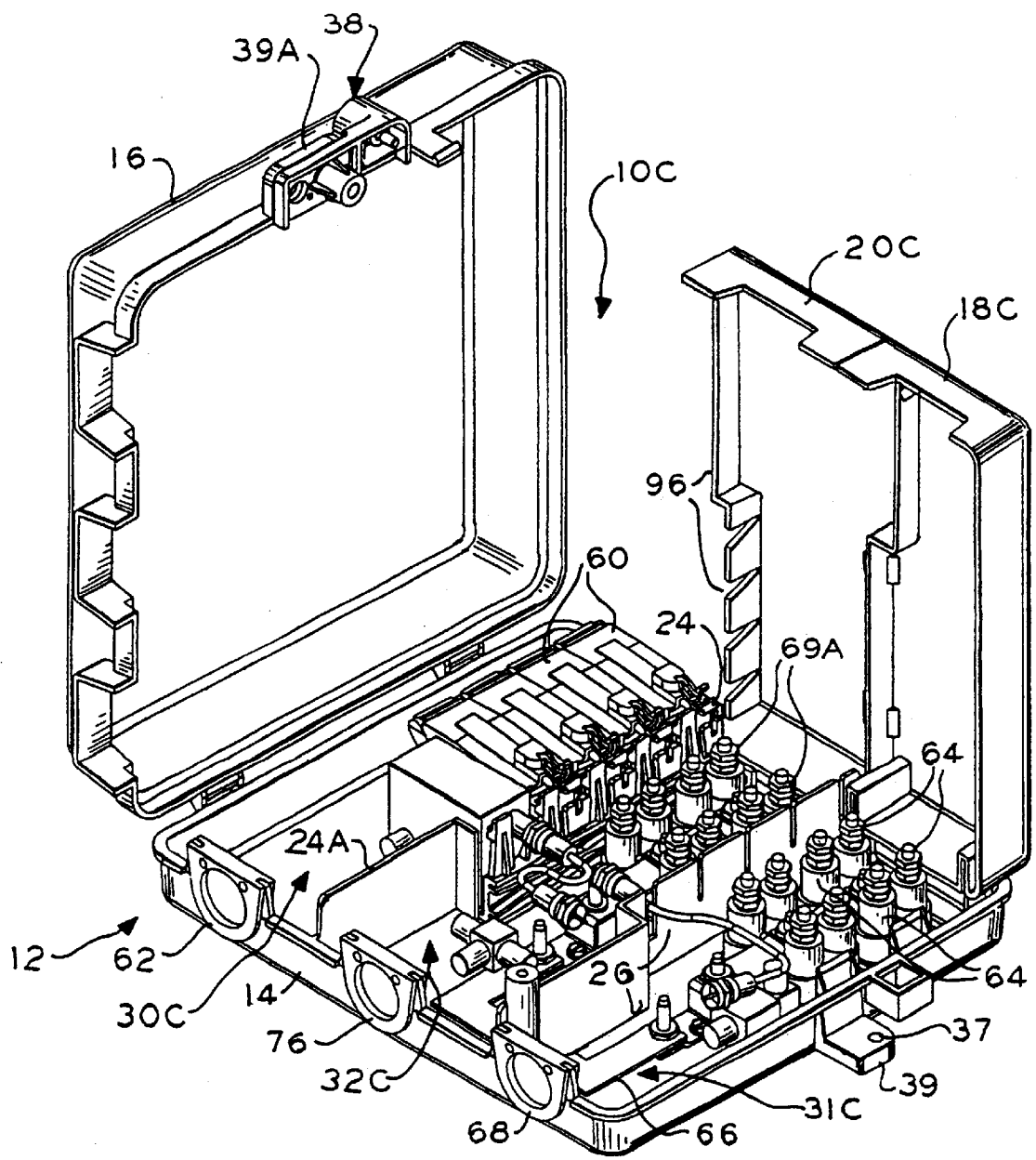
FIGS. 13 and 14 are views similar to FIGS. 11 and 12 but of a still further embodiment of the present invention.
Figure 14:
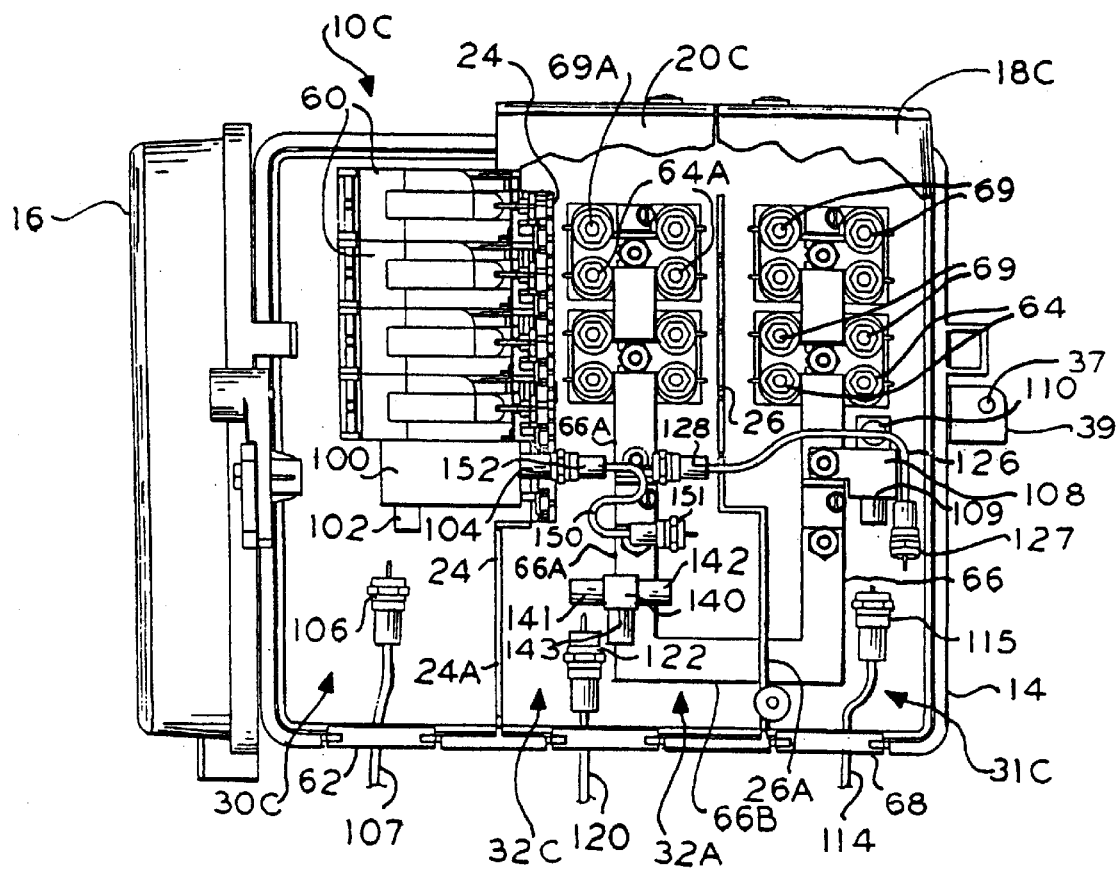

A still further embodiment of the present invention is shown in FIGS. 13 and 14 and indicated by general numerical designation 10C. Apparatus 10C is substantially similar to apparatus 10B of FIGS. 11 and 12 and structural elements present in apparatus 10C which are the same as the structural elements in apparatus 10B are given the same numerical designations and will be understood to perform the same functions. Apparatus 10C of FIGS. 13 and 14 differs from apparatus 10D of FIGS. 11 and 12 in that the lower portion 24A of the mounting wall 24, as viewed in FIG. 14, is offset to the left and the lower portion 26A of the separating member 26, as viewed in FIG. 14, is offset to the right to provide a different subscriber compartment 30C, a different first provider compartment 31C and a different second provider compartment 32C; the first provider cover 18C and the second provider cover 20C differ in that they are complementary in shape to the respective first provider compartment 31C and the second provider compartment 32C. Further, apparatus 10C differs from apparatus 10B in that a different coaxial cable connector 140 is mounted in the second provider compartment 32C, by suitable means (not shown), and also is connected to the ground buss 66A by suitable means (not shown). Coaxial cable connector 140 is of the type known to the art including three female coaxial cable connectors 141, 142 and 143. As is known to those skilled in the art, the female coaxial cable connectors 141, 142 and 143 are interconnected for the transmission of broadband signals therebetween. The female coaxial cable connectors 141 and 142 are axially or linearly aligned and the female coaxial cable connector 143 is disposed at right angles with respect to the connectors 141 and 142.

It will be assumed that a subscriber associated with the subscriber coaxial cable 107, has unfastened and opened the subscriber cover 16 to the position shown in FIG. 5 in the manner described above, has inserted the subscriber coaxial cable 107 through the grommet 62 and has connected the male coaxial cable 106 to the female coaxial cable connector 102 and has chosen to receive broadband signals from the first provider of broadband signals. Accordingly, the first provider will open the covers 16, 18 and 20 as described above to the position shown in FIG. 14 and the first provider will interconnect its male coaxial cable connector 115 provided on the first provider coaxial cable 114 to the female coaxial cable connector 109 provided on the first provider coaxial cable connector 108 and will provide and utilize the first provider jumper coaxial cable 126 to interconnect the female connector 110 provided on the first provider coaxial cable connector 108 and the female coaxial cable connector 142 provided on the coaxial cable connector 140 mounted in the second provider compartment 32C. Next, the first provider will provide and utilize the second jumper coaxial cable 150 provided at its opposite ends with male coaxial cable connectors 151 and 152 to interconnect the female coaxial cable connector 141 provided on the coaxial cable connector 140 with the female coaxial cable connector 104 provided on the subscriber coaxial cable connector 100 to cause the broadband signals from the first provider carried over the first provider coaxial cable 114 to be received by the subscriber coaxial cable 107 for transmission to the subscriber's broadband receiving apparatus such as for example the above-noted subscriber television set.

It next will be presumed that the subscriber has chosen to discontinue the receipt of broadband signals from the first provider and has chosen to receive broadband signals from the second provider. Accordingly, the second provider will unfasten and open the subscriber door 16 and second provider door 20 as described above to the position shown in FIGS. 3 and 4, and, (FIG. 14) the second provider will then disconnect the male coaxial cable connector 128 provided on the first provider jumper coaxial cable 126 from the female coaxial cable connector 142 provided on the coaxial cable connector 140 and will interconnect the male coaxial cable connector 122 provided on the second provider incoming coaxial cable 120 to the female coaxial cable connector 143 whereby, since the jumper coaxial cable 150 remains interconnected between the female coaxial cable connector 141 and the female coaxial cable connector 104 provided on the subscriber coaxial cable connector 100, the subscriber associated with the subscriber coaxial cable conductor 107 will receive broadband signals from the second provider of such signals transmitted over the second provider coaxial cable 120.

In this embodiment, as in the apparatus embodiments shown in FIGS. 11 and 12, the ground bars or busses 66, 66A and ground bar connecting portion 66B remain connected at all times to the coaxial cable connectors 126 and 140 and to the overvoltage protectors 64 and 64A so as to continuously provide overvoltage protection at all times.

It will be understood, with regard to the invention embodiments 10A and 10B of FIGS. 9 and 10 and 11 and 12, respectively, that the first provider of telephone line signals and the first provider of broadband signals associated with the first provider compartment 31 may be a single first provider or such telephone line signals and broadband signals may be provided by different first providers thereof. In the event of one first provider providing the telephone line signals and a second first provider providing broadband signals, each first provider will be provided with a tool or key permitting access to the first provider cover 18. Similarly, there may be one or two second providers of telephone line signals and broadband signals associated with the second provider compartment 32 and in the event that there are two such second providers, both such second providers will be provided with a tool for gaining access to the second provider compartment 32.

Figure 15:
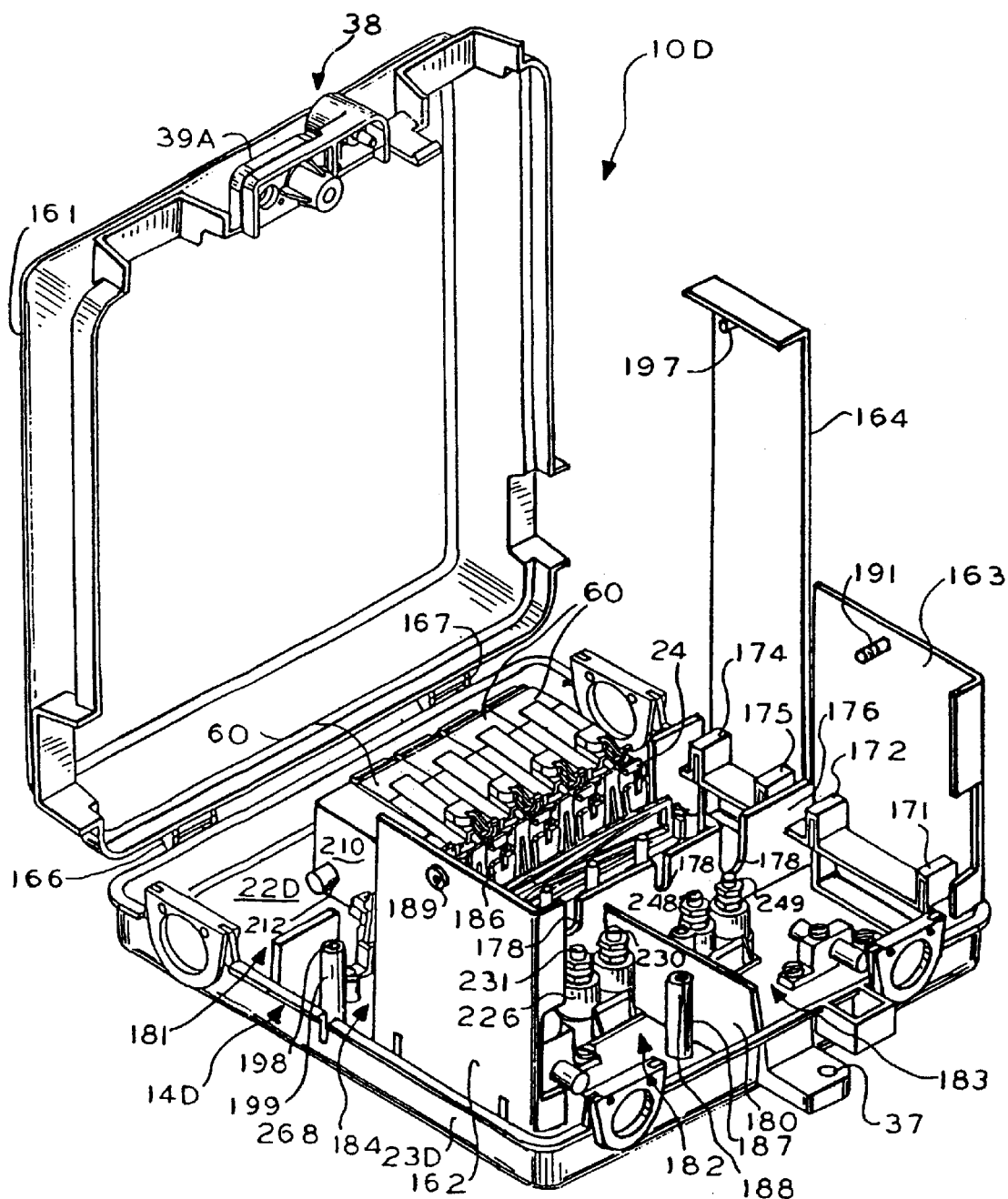
FIGS. 15 and 16 are views similar to FIGS. 13 and 14 but of yet another embodiment of the present invention.

Yet another embodiment of the present invention is shown in FIGS. 15 and 16 and apparatus embodying this further embodiment is indicated by general numerical designation 10D. Structural elements included in apparatus 10D which are the same as structural elements described above and shown in the earlier embodiments are given the same numerical designations, and it will be understood that such structural elements perform the same functions as described above. Generally it will be understood that apparatus 10D is generally similar to apparatus 10C of FIGS. 13 and 14 insofar as permitting a subscriber to receive subscriber service signals from either a first or second provider of such subscriber service signals and for permitting either provider to disconnect from the subscriber premises line the incoming service line of the other provider previously connected to the subscriber premises line and thereafter to connect its incoming service line to the subscriber premises line. Generally, apparatus 10D differs from apparatus 10C in that an additional or interconnecting compartment is provided intermediate the subscriber compartment and the first and second provider compartments and that the door or cover for each provider compartment is provided with an individual fastener which permits only the provider associated with a compartment to open the door to that compartment and to deny access to that compartment to the subscriber and the other provider of subscriber services signals.

More particularly, apparatus 10D includes a housing indicated by general numerical designation 12D and which housing includes a base indicated by general numerical designation 14D, a subscriber door or cover 161, a first provider door or cover 162, a second provider door or cover 163 and an interconnecting compartment door or cover 164. The subscriber cover 161 is mounted pivotally or hingedly to the base 14D by hinges 166 and 167 (FIG. 15), the first provider cover 162 is mounted pivotally or hingedly to the base 14D by hinges 168 and 169 (FIG. 16), the second provider cover 163 is mounted hingedly to the base 14D by hinges 171 and 172, and the interconnecting compartment cover 164 is mounted pivotally or hingedly to the base 14D by hinges 174 and 175.

Apparatus 10D includes the individual subscriber line module mounting member 24 described above and shown for example in FIG. 2, a first compartment separating wall 176 provided with a plurality of inwardly extending indentations 178 (best seen in FIG. 15) through which various jumper conductors may extend as described below and a second compartment separating wall 180. The compartment separating walls 176 and 180 are suitably mounted to the housing bottom 22D by suitable means not shown. The base 14D, in particular bottom 22D and wall 23D, cooperate with the mounting member 24 and the compartment separating members 176 and 180 to provide four compartments, a subscriber compartment indicated by general numerical designation 181, a first provider compartment indicated by general numerical designation 182, a second provider compartment indicated by general numerical designation 183 and an interconnecting compartment indicated by general numerical designation 184. The provider cover 162 upon being closed over the first provider compartment 182 is fastened to the base 14D by a threaded member 186 mounted captively rotatably in the cover 162 and which threaded member 186 threadedly engages the threaded opening 187 provided centrally of the stud 188 extending upwardly from the housing bottom 22D and suitably secured thereto. The threaded member 176 is provided with a head 189 of uncommon shape and only the first provider of subscriber service signals associated with the first provider compartment 182 possesses a tool of uncommon shape which permits only the first provider, and neither the second provider nor the subscriber, to unfasten the threaded member 186 to gain access to the first provider compartment 182. Alternatively, instead of the threaded member 186 having a head 189 of uncommon shape a lock and key arrangement may be used to fasten the first provider cover 162 closed over the first provider compartment 182 and only the first provider of subscriber service signals will have a key to unlock the lock and gain access to the first provider compartment 182.

Similarly, the second provider cover 163 upon being closed over the second provider compartment 183 is fastened to the base 14D by a threaded member 191 mounted captively rotatably in the cover 163 and which threaded member 191 threadedly engages the threaded opening 192 provided centrally of the study 193 (best seen in FIG. 16) extending upwardly from the housing bottom 22D and suitably secured thereto. The threaded member 191 is provided with a head 195 (FIG. 16) of uncommon shape and only the second provider of subscriber service signals possesses a tool of uncommon shape which permits only the second provider, and neither the first provider nor the subscriber, to unfasten the threaded member 191 and gain access to the second provider compartment 183. Alternatively, instead of the threaded member 191 having a head of uncommon shape a lock and key arrangement may be used to fasten the second provider cover 163 closed over the second provider compartment 183 and only the second provider of subscriber service signals will have a key to unlock the lock and gain access to the second provider compartment 183. The interconnecting compartment cover 164 upon being closed over the interconnecting compartment 184 is fastened to the base 14D by a threaded member 197 (FIG. 15) mounted captively rotatably in the cover 164 and which threaded member 197 threadedly engages the threaded opening 198 provided centrally of the stud 199 extending upwardly from the housing bottom 22D and suitably secured thereto. The threaded member 197 is provided with a head 200 (FIG. 16) of uncommon shape and only the first provider and second provider of subscriber service signals possess a tool of uncommon shape which permits only the first and second providers of subscriber service signals, and not the subscriber, to unfasten the threaded member 197 and gain access to the interconnecting compartment 184. Alternatively, instead of the threaded member 197 having a head 200 of uncommon shape, a lock and key arrangement may be used to fasten the interconnecting compartment cover 164 closed over the interconnecting compartment 184 and only the first and second providers of subscriber service signals, and not the subscriber, will have a key to unlock the lock and gain access to the interconnecting compartment 184. Upon the first provider cover 162, the second provider cover 163, the interconnecting compartment cover 164, being fastened to the base 14D as described above, the subscriber cover 161 is fastened closed over the subscriber compartment 181 and the previously closed covers 162, 163 and 164 and fastened to the base 14D as described above, particularly in connection with FIGS. 5, 5A and 5B, whereby either the subscriber, the first provider or the second provider of subscriber service signals may unfasten the subscriber cover as also described above and may do so in connection with the override mechanism 38 shown particularly in FIG. 5A and described above.

Referring still further to FIGS. 15 and 16, and in particular to FIG. 16, a suitable subscriber coaxial cable connector 210, of the type known to the art, is suitably mounted in the subscriber compartment 181 and includes interconnected pairs of female coaxial cable connectors 212 and 214. As shown in FIG. 16, a subscriber coaxial cable 216 including a male coaxial cable connector 218 is inserted into the subscriber compartment 181 through the grommet 219 and the male coaxial cable connector 218 is connected to the female coaxial cable connector 212.

Mounted in the first provider compartment 182 is a suitable coaxial cable connector 220, of the type known to the art, and which includes interconnected pairs of female coaxial cable connectors 221 and 222. The coaxial cable connector 220 is suitably mounted to the bottom 22D, such as for example by the screws as shown. A first provider incoming coaxial cable 224 for carrying broadband signals from a first provider of such signals, FIG. 16, including a male coaxial cable connector 225 may be inserted into the first provider compartment 182 through the grommet 226 and the male coaxial cable connector 224 may be connected to the female coaxial cable connector 221. Also mounted in the first provider compartment 182 is a pair of suitable overvoltage protectors 228 and 229 providing a first pair of telephone terminals 230 and 231. The overvoltage protectors 228 and 229 are mounted in the first provider compartment 182 by bolt and nut 238 being mounted to a suitable ground buss or bar 236 which is mounted to the housing bottom 222D suitably, such as by screws. It will be noted from FIG. 16 that the ground buss or bar 236 resides in the first provider compartment 182, the second provider compartment 183, and extends into the interconnecting compartment 184; the ground buss or ground bar 236 extends under the compartment separating walls 176 and 180. It will be understood that the ground buss or ground bar 236 extends under the compartment separating walls 176 and 180. Although not shown in FIG. 16 for clarity of presentation, it will be understood that a first incoming telephone line carrying telephone line signals from a first provider of telephone line signals will be inserted into the first provider compartment 182 through the grommet 226 and suitably connected to the first pair of telephone terminals 230 and 231.

A suitable coaxial cable connector 240, of the type known to the art, is suitably mounted (such as by screws as shown) in the second provider compartment 183, and includes interconnected pair of female coaxial cable connectors 241 and 242. A second provider incoming coaxial cable connector 244 for carrying broadband signals from a second provider thereof, and including a male coaxial cable connector 245, may be inserted into the second provider compartment 183 through the grommet 246 and the male coaxial cable connector 245 connected to the female coaxial cable connector 241.

Also mounted in the second provider compartment 183 is a suitable pair of overvoltage protectors 243 and 247 providing a second pair of telephone terminals 248 and 249. The overvoltage protectors 248 and 249 are mounted in the second provider compartment 183 by being mounted by bolt or nut 238A to the ground buss or ground bar 236. Although not shown in FIG. 16 for clarity of presentation, it will be understood that a second incoming telephone line carrying telephone line signals from a second provider of telephone line signals will be inserted into the second provider compartment 183 through the grommet 246 and suitably connected to the second pair of telephone terminals 248 and 249.

It will be presumed that the subscriber, and referring again to FIG. 16, desires to receive broadband signals, such as cable television signals, from the first provider of such signals whereupon the subscriber will so notify the first provider of such signals. The first provider will open the subscriber cover 161, the first provider cover 162, and the interconnecting compartment cover 164 in the manner described above, and will interconnect the first provider incoming coaxial cable 234 with the subscriber coaxial cable 216 by providing and utilizing the jumper coaxial cable 250 provided with interconnected male coaxial cable connectors 251 and 252 at its opposite ends. The first provider will connect the male coaxial cable connector 251 to the female coaxial cable connector 222 residing in the first provider compartment 182 and will connect the male coaxial cable connector 252 to the female coaxial cable connector 214 extending into the interconnecting compartment 184. The first provider then will refasten the first provider cover 182 and the interconnecting compartment cover 184 to the base 14D and then will refasten the subscriber cover 161 over the subscriber compartment 181 and over the closed covers 182 and 184 and to the base 14D and the subscriber will receive broadband signals, such as cable television signals, from the first provider of such signals.

It now will be presumed that the subscriber has decided to discontinue the receipt of broadband signals from the first provider of such signals and has decided to receive broadband signals from the second provider of broadband signals, such as for example cable television signals. The subscriber will so notify the first and second providers of such signals and the second provider of broadband signals will open the subscriber cover 161, the second provider cover 163 and the interconnecting compartment cover 164 in the manner described above, whereafter the first provider will disconnect the jumper coaxial cable 250 from the female coaxial cable connector 214 and will provide and use the jumper coaxial cable 260 to interconnect the second provider of coaxial cable 224 to the subscriber coaxial cable 216. The jumper coaxial cable 260 is provided with interconnected male coaxial cable connectors 261 and 262 at its opposite ends, and the second provider will interconnect the male coaxial cable 261 to the female coaxial cable 242 residing in the second provider compartment 183 and the male coaxial cable connector 262 to the female coaxial cable connector 214 extending into the interconnecting compartment 184. The second provider of broadband signals will refasten the second provider cover 163, the interconnecting compartment cover 164 and the subscriber cover 161 to the base 14D as described above whereafter the subscriber will receive broadband signals, such as cable television signals, from the second provider of such signals.

It will be understood that the subscriber could at first have decided to receive broadband signals from the second provider of broadband signals whereupon the second provider of such signals would have opened the second provider cover 163, the interconnecting compartment cover 164 and the subscriber cover 161, as described above, and thereafter would have interconnected the second coaxial cable connector 244 to the subscriber coaxial cable 216 through the use of the jumper coaxial cable 260 in the manner described above. Thereafter, the subscriber could have decided to discontinue the receipt of broadband signals from the second provider of such signals and could have decided to receive broadband signals from the first provider of such signals whereupon the first provider of broadband signals would open the subscriber cover 161, the first provider cover 162 and the interconnecting compartment cover 164, disconnect the second provider jumper coaxial cable 260 and would connect the first provider coaxial cable 224 to the subscriber cable 216 by the jumper coaxial cable 250, as described above. The first provider thereafter would refasten the first provider cover 162, the interconnecting compartment cover 164, and the subscriber cover 161 to the housing base 14D, and the subscriber would receive broadband signals, such as cable television signals, from the first provider of such signals.

Referring further to FIG. 16, and to the ground buss or ground bar 236, it will be noted that the first provider coaxial cable connector 220 is connected to the ground buss 236 by the ground connector 264 and that the second provider coaxial cable connector 240 is connected to the ground buss 236 by a second ground connector or conductor 265. The ground buss or ground bar 236 is connected to earth ground by a suitable ground connector or conductor 267 with the ground connector or conductor 267 exiting the base 14D through the indentation 268 (best seen in FIG. 15) formed in the base wall 23D. Since as taught above only the first provider has access to the first provider compartment 182 and only the second provider has access to the second provider compartment 183, neither provider of subscriber service signals can disconnect the other provider's coaxial cable connector from the ground buss or ground bar 236 while either provider is disconnecting the other provider's incoming coaxial cable from the subscriber's coaxial cable and is interconnecting its incoming coaxial cable to the subscriber coaxial cable. Thus the incoming coaxial cables remain connected to earth ground at all times unless either the first or second provider intentionally disconnects its own coaxial cable connector from the ground buss 236.

Mounted in the interconnecting compartment 184, FIG. 16, is a telephone terminal or connecting block 70 of the type noted above which includes pairs of telephone terminals 74. The telephone terminal or connecting block 70 may be suitably mounted to the housing bottom 220D such as by suitable screws S.

Apparatus 10D also permits the subscriber to receive telephone line signals from either a first or a second provider of such signals and permits the subscriber to discontinue the receipt of telephone line signals from a previously chosen provider of such signals and thereafter choose to receive telephone line signals from the other provider of such signals. This is illustrated diagrammatically in FIG. 17. It will be presumed that a subscriber whose telephone subscriber premises line 80 has been connected to representative individual subscriber line module 60 (any one of module 60 shown in FIGS. 15 and 16) and has chosen to receive telephone line signals from the first provider of such signals associated with the first provider compartment 182. The first provider of telephone line signals will unfasten the subscriber cover 161, the first provider cover 162 and the interconnecting compartment cover 164, FIGS. 15 and 16, as described above, and will connect its incoming telephone line 270 to the first pair of telephone terminals 230 and 231. The pair of conductors 82 of the type described above in connection with FIGS. 7 and 8, and connected to contacts (not shown) in the jack 83 provided in the individual subscriber line module 60, extend outwardly from the module 60 across and through indentations provided in the individual subscriber line module mounting member 24 and which indentations are shown particularly in FIG. 2. The first provider of telephone line signals will connect the conductors 82, for example, to the pair of telephone terminals 74C provided on the telephone terminal block 70 and thereafter will interconnect its incoming telephone line 270 to the telephone terminals 74C by providing and using the jumper telephone line 272. The first provider of telephone line signals thereafter will fasten the first provider door to first provider cover 162, the interconnecting compartment cover 164, and the subscriber cover 162 to the base 14D as described above in connection with FIGS. 15 and 16 whereafter the subscriber will receive telephone line signals from the first provider of such signals. It will be presumed that the subscriber has decided to discontinue the receipt of telephone line signals from the first provider of such signals and has decided to receive telephone line signals from the second provider of such signals. After the subscriber so notifies the first and second providers of telephone line signals, the second provider of telephone line signals will unfasten the subscriber cover 161, the second provider cover 163 and the interconnecting compartment cover 164 from the base 14D as described above and will disconnect the first provider telephone line jumper 272 from the pair of telephone terminals 74C and thereafter will provide or utilize a jumper telephone line, not shown, to interconnect its incoming telephone line 274 to the pair of telephone terminals 74C after which the second provider of telephone line signals will refasten the second provider cover 163, the interconnecting compartment cover 164 and the subscriber compartment cover 161 to the base 14D and the subscriber thereafter will receive telephone line signals from the second provider of such signals. Alternatively, the second provider of telephone line signals could disconnect the conductors 82 from the terminals 74C and could connect the conductors 82 to, for example, the telephone line terminals 74B in the interconnecting compartment 184 and thereafter could provide and utilize a jumper telephone line, not shown, to interconnect the second pair of telephone terminals 246 and 249 to the pair of telephone terminals 74B after which the second provider will refasten the second provider cover 163, the interconnecting compartment cover 164 and the subscriber cover 161 to the base 14D and the subscriber will receive telephone line signals from the second provider of such signals. It will be understood that the subscriber could have chosen to first receive telephone line signals from the second provider of such signals, could thereafter have chosen to discontinue the receipt of telephone line signals from the second provider of such signals, and could have chosen to receive telephone line signals from the first provider of such signals and, in such event, the sequence of connections described above would be reversed.

Referring again to FIG. 16, it will be noted that in the apparatus embodiment 10D of the present invention four individual subscriber line modules 60 may be included and mounted in the subscriber compartment 181 as described above in connection with the mounting of the individual subscriber line modules 60 in the subscriber compartment 30 of FIG. 1. In such event, it will be understood that the four individual subscriber line modules 60 may be associated with a single subscriber, and one of these individual subscriber line modules may be connected to the subscriber's main telephone subscriber premises line and the other three individual subscriber line modules may be connected to subscriber premises line extensions. In such event, it will be understood that the conductors 82, FIG. 17, extending from such individual subscriber line modules, will be connected to the pairs of telephone terminals 74, such as 74A, 74B and 74C shown in FIG. 17, to permit the subscriber to connect its telephone subscriber premises line and its subscriber premises line extensions to the incoming telephone lines of either a first or second provider of telephone line signals as described above in connection with conductors 82 shown in FIG. 17.

Figure 18:
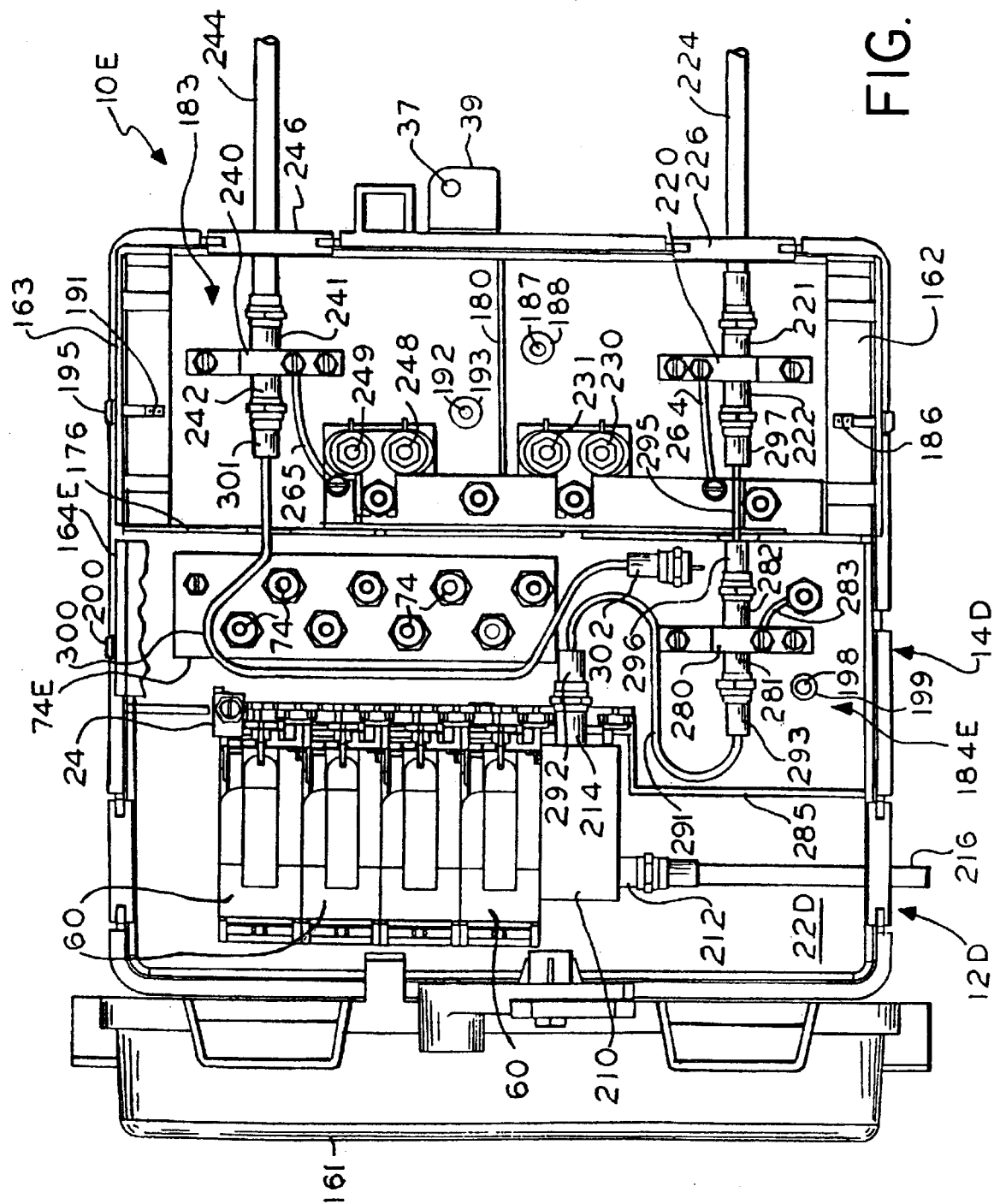
FIG. 18 is an alternative embodiment to the embodiment shown in FIGS. 15 and 16, particularly as shown in FIG. 16.

Apparatus indicated by general numerical designation 10E in FIG. 18 embodies a still further embodiment of the present invention. Apparatus 10E is substantially the same as apparatus 10D shown in FIGS. 15 and 16, particularly FIG. 16, and structural elements included in apparatus 10E which are the same as structural elements included in apparatus 10D of FIG. 18 are given the same numerical designations and it will be understood that they perform the same functions. Apparatus 10E differs from apparatus 10D in that the lower portion of the interconnecting compartment 184E has been enlarged, by the inclusion of a compartment separating wall 285 suitably mounted to the housing bottom 22D and joining the mounting member 24, to accommodate the suitable mounting of a suitable coaxial cable connector 280 to the housing bottom of 22D. Coaxial cable connector 280 includes interconnected pair of female coaxial cable connectors 281 and 282. Coaxial cable connector 280 is connected to the ground buss or bar 236 by a suitable ground connecting conductor 283. It will be understood that although the interconnecting compartment cover 164E is only partially shown in FIG. 18, interconnecting compartment cover 160E will be provided with a shape complementary to the shape of interconnecting compartment 184E.

Apparatus 10E permits a subscriber to receive broadband signals, for example cable television signals, from either a first or second provider of such signals and permits either provider to connect its incoming coaxial cable to the subscriber coaxial cable 216 and permits either provider of broadband signals to disconnect the incoming coaxial cable of the other provider of broadband signals previously connected to the subscriber coaxial cable and thereafter connects its incoming coaxial cable to the subscriber coaxial cable. For example, and referring particularly to FIG. 18, it will be presumed that the subscriber has chosen first to receive broadband signals from the first provider of such signals whereupon the first provider will unfasten the subscriber cover 161, the first provider cover 162 and the interconnecting compartment cover 164E from the base 14D, and the first provider will provide and utilize a first jumper coaxial cable 291 provided with male coaxial cable connectors 292 and 293 to interconnect the female coaxial cable connectors 214 and 281. The first provider thereafter will provide and utilize a second jumper coaxial cable 295 provided at its opposite ends with interconnected male coaxial cable connectors 296 and 297 to interconnect the female coaxial cable connectors 282 and 222. Thereafter, the first provider will refasten the first provider cover 162, the interconnecting compartment cover 164E and the subscriber cover 162 to the base 14D and the subscriber thereafter will receive broadband signals, such as cable television signals, from the first provider of such signals. It next will be presumed that the subscriber has decided to discontinue the receipt of broadband signals from the first provider of such signals and has decided to receive broadband signals from a second provider of such signals. The subscriber accordingly will notify the first and second providers of such broadband signals whereafter the second provider of broadband signals will unfasten the subscriber cover 161, the second provider cover 163 and the interconnecting compartment cover 164E from the housing base 14D. Next, the second provider will disconnect the male coaxial cable connector 296 of the jumper coaxial cable 295 from the female coaxial cable connector 282 and thereafter will provide and utilize a third jumper coaxial cable 300 provided at its opposite ends with interconnected male coaxial cable connectors 301 and 302 to interconnect the female coaxial cable connector 242 mounted in the second provider compartment 183 with the female coaxial cable connector 282 mounted in the interconnecting compartment 184E. Then, the second provider of broadband signals will refasten the second provider cover 163 and the interconnecting compartment cover 164E and the subscriber cover 161 to the housing base 14D and the subscriber thereafter will receive broadband signals from the second provider of such signals. Had the subscriber first chosen to receive broadband signals from the second provider of such signals, the second provider of such signals would have utilized the jumper coaxial cable 300 to interconnect its incoming coaxial cable 244 to the subscriber coaxial cable 216, and had the subscriber decided to discontinue the receipt of broadband signals from the second provider of such signals and to commence the receipt of broadband signals from the first provider of broadband signals, the first provider of broadband signals would unfasten the first provider cover 162, the interconnecting cover 164 and the subscriber cover 161 from the housing base 14D, would disconnect the male coaxial cable connector 302 from the female coaxial cable connector 282 mounted in the interconnecting compartment 184E and would have connected its incoming coaxial cable 224 to the subscriber coaxial cable 216 utilizing the jumper coaxial cable 295 as shown in FIG. 18 described above. Thereafter, the first provider would refasten the first provider cover 162, the interconnecting compartment cover 164 and the subscriber cover 161 to the housing base 14D and the subscriber thereafter would receive broadband signals from the first provider of such signals.

Figure 17:
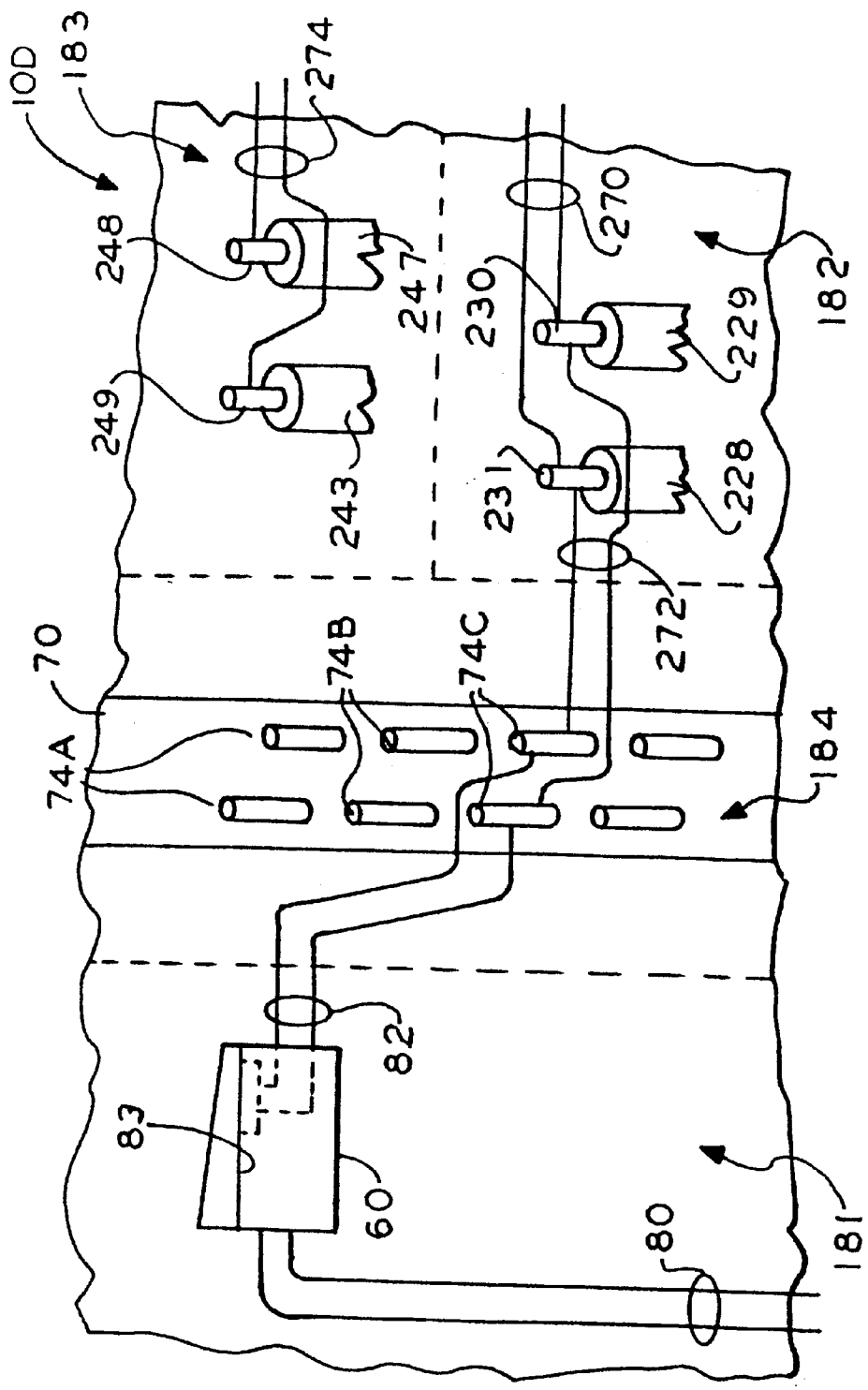
FIG. 17 is a partial diagrammatical illustration illustrating the interconnection of a telephone subscriber premises line to either one of two incoming telephone service lines from two providers of telephone signals that may be accomplished utilizing the apparatus shown in FIGS. 15 and 16.

It will be understood that the telephone terminals 74 provided on the telephone terminal or connector block 74E and the first provider pair of telephone terminals 230 and 231 and the second provider pair of telephone terminals 248 and 249 may be utilized to provide telephone line signals to the subscriber from either the first provider of telephone line signals as described above in connection with apparatus 10D of FIGS. 15 and 16 and as illustrated diagrammatically in FIG. 17 and described above.

Figure 19:
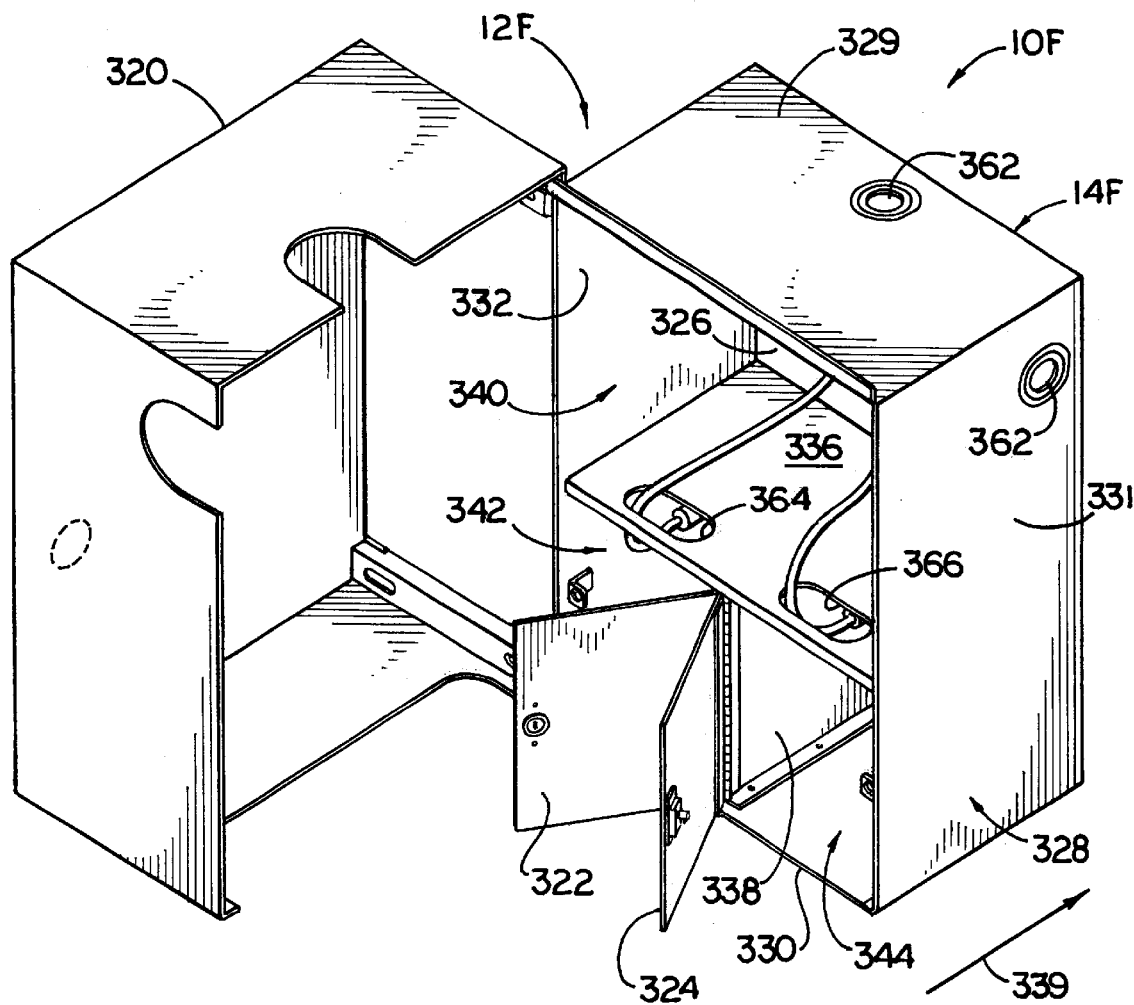
FIG. 19 is a front perspective view of a still further embodiment of apparatus embodying the present invention and showing the doors or covers in the open positions.
Figure 20:
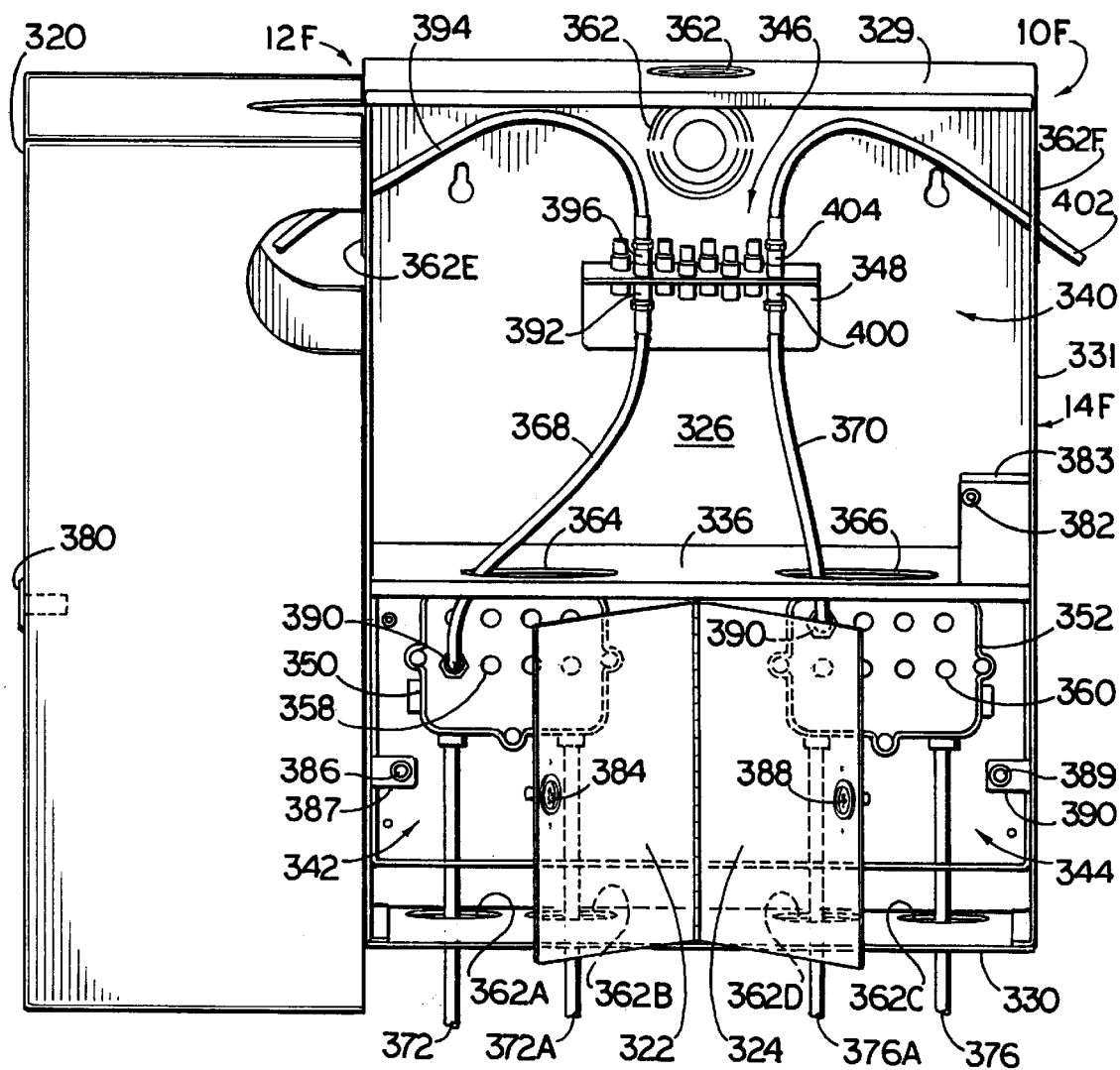
FIG. 20 is a front elevational view of the apparatus of FIG. 19.
Figure 21:
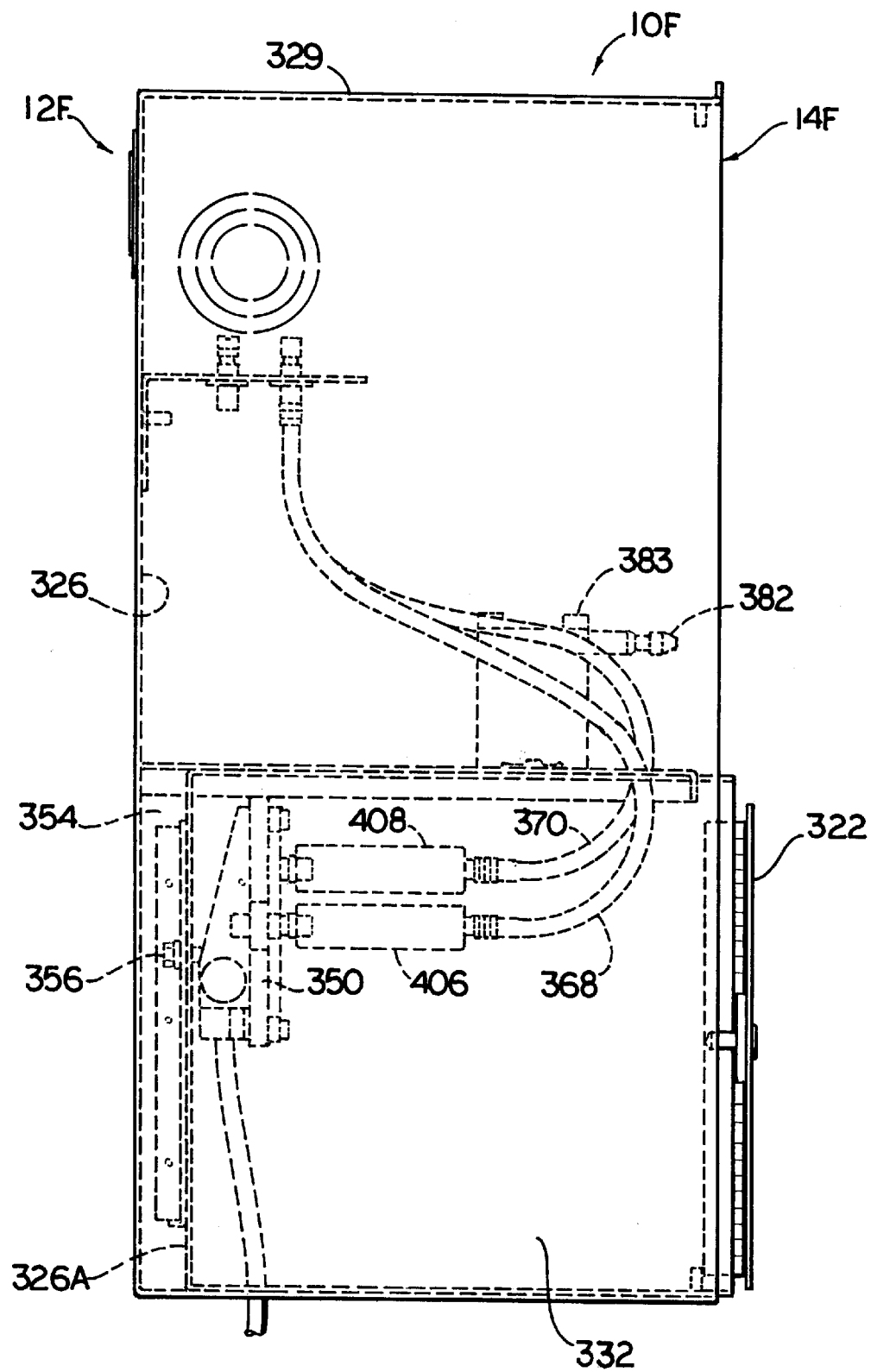
FIG. 21 is a side elevational view of the apparatus of FIG. 20 with the outer door or cover removed for convenience of illustration of the remaining apparatus.

Referring now to FIGS. 19–21, a further alternate embodiment of apparatus of the present invention is shown and indicated by general numerical designation 10F. It will be generally understood in accordance with the teachings of the present invention that the apparatus 10F may be used to connect up to eight subscriber premises lines, namely eight subscriber coaxial cables to the incoming service line, namely the incoming coaxial cable of either a first or a second provider of subscriber service signals, namely, broadband signals. Apparatus 10F may be further used to permit either the first or second provider of broadband signals, at the request of a subscriber, to disconnect the subscriber's subscriber coaxial cable from the incoming coaxial cable of the previously selected other provider of broadband signals and to reconnect the requesting subscriber's subscriber coaxial cable to the incoming coaxial cable of the newly selected provider of broadband signals. It will be further understood in accordance with the teachings of the present invention that other multiples or numbers of subscriber coaxial cables and incoming coaxial cables may be so used.

Apparatus 10F, FIGS. 19–21, comprises a housing indicated by general numerical designation 12F and which housing includes a base indicated by general numerical designation 14F and doors or covers 320, 322 and 324. Base 14F includes a bottom or back wall 326 circumscribed by an outwardly extending wall indicated by general numerical designation 328 and which wall includes, as viewed in FIG. 19, a top wall 329, a bottom wall 330, a right side wall 331 and a left side wall 332. Base 14F further includes a horizontal separating wall 336 and a vertical separating wall 338 best seen in FIG. 19. The outer cover 320 is mounted to the base 14F in the manner known to the art which permits the cover 320 to pivot with respect to the base and which permits the cover 320 upon being pivoted over the base to slide over the base in the direction of the arrow 339 shown in FIG. 19 to cause the outer cover 320 to reside over the base 14F and reside substantially coextensively therewith. The covers 322 and 324 are mounted pivotally or hingedly to the vertical separating wall 338 for pivotal movement toward an away from the base 14F. It will be understood that the base 14F and covers 320, 322 and 324 and separating walls 336 and 338 may be made of a suitable metal and formed by metal forming techniques known to the art and assembled and secured together as shown in FIG. 19 to provide the apparatus 10F.

As may be best seen in FIGS. 19 and 20, the bottom or back wall 326, wall 328 and separating walls 336 and 338 cooperatively provide a first or interconnecting compartment indicated by general numerical designation 340, a first provider compartment indicated by general numerical designation 342 and a second provider compartment indicated by general numerical designation 344. The first provider compartment 342 is associated with a first provider of subscriber service signals, namely a first provider of broadband signals, and the second provider compartment 344 is associated with a second provider of subscriber service signals, namely a second provider of broadband signals. The cover 320 is provided with a fastener 380 for being fastened to a fastener 382 mounted on the bracket 383 provided in the interconnecting compartment 340 to fasten the cover 320 to the base 14F and closed over the previously closed doors or cover 322 and 324. The fastener 380 is of an uncommon shape or configuration and is for being unfastened only by a tool or key of uncommon shape which will be possessed only by both the first and second providers of the subscriber service signals whereby only the first and second providers of broadband signals can open the door 320 and have access to the interconnecting compartment 340. The door 322 is provided with a fastener 384 for being fastened to a fastener 386 provided on the bracket 387 mounted in the first provider compartment 342. The fastener 384 is of an uncommon shape or configuration and only the first provider of broadband signals will possess a tool or key of uncommon shape for unfastening the fastener 384 whereby only the first provider of broadband signals can open the door 332 and have access to the first provider compartment 342. Similarly, the door 324 is provided with a fastener 388 for being fastened to a fastener 389 provided in the second provider compartment 344. The fastener 388 is of an uncommon shape or configuration, and only the second provider of broadband signals will be provided with a tool of uncommon shape for unfastening the fastener 388 whereby only the second provider of broadband signals can open the door 324 and have access to the second provider compartment 344.

As may be best seen in FIG. 20, apparatus 10F may further include eight F-82 bulkhead coaxial cable connectors of the type known to the art and which are indicated by general numerical designation 346; the connectors reside in the first or interconnecting compartment 340. As is further known to the art, each F-81 bulkhead coaxial cable connector includes a pair of back-to-back female coaxial cable connectors interconnected to carry broadband signals therebetween. The plurality of F-81 bulkhead coaxial cable connectors are suitably mounted to a bulkhead or demarc-plate 348 which is suitably mounted to the bottom or rear wall 326 such as by welding or riveting. A first broadband signal tap 350 resides in the first provider compartment 342 and a broadband signal tap 352 resides in the second provider compartment 344. As may be noted from FIG. 21, the lower portion of the base or rear wall 326 may be a double wall, including the additional bottom or rear wall 326A, providing a compartment 354 for facilitating mounting of the taps internally of the base 14F and which permits, for example, representative tap 350, FIG. 21, to be mounted to the internal bottom or rear wall 326A by the bolt 356 as shown. The taps 350 and 352 are of the types known to the art for tapping, or tapping into, a coaxial cable carrying broadband signals to provide, in the embodiment shown, eight broadband signal outputs of the broadband signals carried by the tapped coaxial cable. The eight outputs of each tap 350 and 352 include eight female coaxial cable connectors such as representative female coaxial cable connector 358 provided on tap 350 as shown in FIG. 20 and representative female coaxial cable connector 360 provided on tap 352 as shown in FIG. 20.

The base 14F, note particularly FIGS. 19 and 20, is provided with a plurality of knock-outs 362 (some of which are given alphabetical suffixes and referred to below) for permitting coaxial cables to enter and exit the housing 12F. Also, the horizontal separating wall 336 is provided with a pair of openings 364 and 366, as shown in FIGS. 19 and 20, for permitting jumper coaxial cables, such as representative jumper coaxial cables 368 and 370, to be inserted therethrough to interconnect the female coaxial cable connectors provided on the taps 350 and 352 with the F-81 bulkhead coaxial cable connectors 346.

Referring again to FIG. 20, a first provider of broadband signals is associated with a first provider compartment 342 and the incoming coaxial cable 372 from the first provider of broadband signals enters the first provider compartment 342 through the knock-out or access opening 362A and is connected to the tap 350. The tap 350, as noted above, provides eight broadband signal outputs of the broadband signals carried by the incoming coaxial cable 372 and the incoming coaxial cable 372 exits the tap 350 in the form of the coaxial cable 372A which exits the first provider compartment 342 through the knock-out or access opening 362B. Similarly, a second provider of broadband signals is associated with the second provider compartment 344 and the incoming coaxial cable 376 from the second provider of broadband signals enters the second provider compartment 344 through the knock-out or access opening 362C and is connected to the tap 352. The tap 352, as noted above, provides eight broadband signal outputs of the broadband signals carried by the incoming coaxial cable 376 and the incoming coaxial cable 376 exits the tap 350 in the form of the coaxial cable 376A which exits the second provider compartment 344 through the knock-out or access opening 362D.

It will first be assumed that the covers 322 and 324 have been fastened closed respectively over the first and second provider compartments 342 and 344 and that the cover 320 has been fastened closed over the closed doors 322 and 324 and fastened to the base 14F. It will be further presumed that a first subscriber has selected the first provider of broadband signals from which to receive broadband signals whereupon the first provider of broadband signals will unfasten the cover 320 and move the cover to the position shown in FIGS. 19 and 20 to gain access to the interconnecting compartment 340, the first provider will then unfasten the door 322 to gain access to the first provider compartment 342 whereafter the first provider of broadband signals will provide the jumper coaxial cable 368 and will insert the jumper coaxial cable 368 through the opening 364 and will interconnect the jumper coaxial cable 368 between the female coaxial cable connector 390 provided on the tap 350 and the female coaxial cable connector 392 mounted to the bulkhead plate 348. The first provider will then connect the first subscriber coaxial cable 394 to the female coaxial cable connector 396 and will insert the subscriber coaxial cable 394 through the knock-out or access opening 362E and run the cable 394 to the first subscriber's broadband signal user equipment such as, for example, a television set. Then, the first provider of broadband signals will fasten the door 322 closed over the first provider compartment 342 and will refasten the outer cover 380 to the base 14F. Similarly, it will be presumed that a second subscriber has selected the second provider of broadband signals from which to receive broadband signals whereupon the second provider of broadband signals will unfasten the cover 380 and move the cover to the position shown in FIGS. 19 and 20 to gain access to the interconnecting compartment 340, the second provider will then unfasten and open the door 324 to gain access to the second provider compartment 344 whereafter the second provider of broadband signals will insert the jumper coaxial cable 370 through the opening 366 and will interconnect the jumper coaxial cable 370 between the female coaxial cable connector 398 provided on the tap 352 and the female coaxial cable connector 400 mounted to the bulkhead plate 348. The second provider will then connect the second subscriber coaxial cable 402 to the female coaxial cable connector 404 and will run the subscriber coaxial cable 402 through the knock-out or access opening 362F and to the second subscriber's broadband signal user equipment such as, for example, a television set. Then, the second provider of broadband signals will fasten the door 324 closed over the second provider compartment 344 and will refasten the outer cover 380 to the base 14F.

Now it will be presumed, by way of example, that the first subscriber of subscriber service signals, namely broadband signals, has decided to discontinue receiving broadband signals from the first provider of broadband signals and has now decided to receive subscriber service signals, namely broadband signals, from the second provider of broadband signals. Upon being so advised, the second provider of broadband signals will open the cover 380 as described above, will open the door 324 as described above to gain access to a second provider compartment 344 whereafter the second provider of broadband signals will disconnect the jumper coaxial cable 368 from the female coaxial cable connector 392 and will provide a further jumper coaxial cable, not shown, and will interconnect the further jumper coaxial cable connector to the female coaxial cable connector 392 and to an unused output or female coaxial cable connector provided on the tap 352 whereafter the first subscriber will receive broadband signals from the second provider of broadband signals. Thereafter, the second provider of broadband signals will reclose the doors 324 and 380 as described above. For convenience of presentation, the connections of only two subscriber coaxial cables to the incoming coaxial cables from the first and second providers of broadband signals have been illustrated in FIG. 20 and described above. However, it will be understood in accordance with the teachings of the present invention that the apparatus 10F may be utilized to connect up to eight subscriber coaxial cables to the incoming coaxial cable of either the first or second provider of broadband signals, or combinations thereof, and that upon any subscriber coaxial cable being first connected to the incoming coaxial cable of either one of the providers of broadband signals such subscriber may decide to discontinue the receipt of broadband signals from the previously selected provider of broadband signals and to receive broadband signals from the other provider of broadband signals and that the apparatus 10F may be used by the newly selected provider of broadband signals to disconnect the subscriber coaxial cable of such subscriber from the incoming coaxial cable of the previously selected provider and thereafter connect its incoming coaxial cable to such subscriber coaxial cable.

Referring further to FIG. 21, it will be understood that filters, of the type known to the art, indicated by numerical designations 406 and 408 may be interconnected between the outputs of the taps 350 and 352 to filter out channels or broadband signals not selected by a subscriber.

It will be understood that the incoming service lines, incoming telephone lines and/or incoming coaxial cables, referred to above, shown in the drawings, and referred to in the appended claims, can be carrying telephone line signals and broadband signals originating from a telephone central office, a satellite dish, a cable television head end, a satellite feed, and the like.

It will be understood by those skilled in the art that many variations and modifications of the present invention may be made without departing from the spirit and the scope thereof.

What is claimed is:

1. Apparatus for connecting a subscriber premises line to either a first incoming service line from a first service provider or a second incoming service line from a second service provider, comprising:

a housing having a subscriber compartment, a first provider compartment, and a second provider compartment;

a first connector in said subscriber compartment electrically connected to said subscriber premises line;

a second connector in said second provider compartment electrically connected to said subscriber premises line;

a third connector in said first provider compartment electrically connected to said first incoming service line;

a fourth connector in said second provider compartment electrically connected to said second incoming service line;

wherein either the third connector or the fourth connector can be electrically connected to said second connector at any one time to connect said first or second incoming service line, respectively, to said subscriber premises line;

wherein either the first or second service provider can disconnect the other service provider's incoming service line from said second connector and connect its incoming service line to said second connector.

2. Apparatus for connecting a subscriber premises line to either a first incoming service line from a first service provider or a second incoming service line from a second service provider, comprising:

a housing having a subscriber compartment, an interconnecting compartment, a first provider compartment, and a second provider compartment;

a first connector in said subscriber compartment electrically connected to said subscriber premises line;

a second connector in said interconnecting compartment electrically connected to said subscriber premises line;

a third connector in said first provider compartment electrically connected to said first incoming service line;

a fourth connector in said second provider compartment electrically connected to said second incoming service line;

wherein either the third connector or the fourth connector can each be electrically connected to said second connector at any one time to connect said first or second incoming service line, respectively, to said subscriber premises line; and wherein either the first or second service provider can disconnect the other service provider's incoming service line from said second connector and connect its incoming service line to said second connector.

3. Apparatus for permitting either of first and second providers of subscriber service signals to connect its incoming service line to the subscriber premises line of a subscriber, comprising:

first terminating means for terminating the subscriber premises line; and second terminating means for terminating the incoming service lines of the first and second providers and for permitting either of the first or second providers to connect its incoming service line to the subscriber premises line, and for permitting either of the first or second providers to disconnect from the subscriber premises line the incoming service line of the other provider previously connected to the subscriber premises line and thereafter connect its incoming) service line to the subscriber premises line.

4. Apparatus for connecting a subscriber premises line to either the incoming service line of a first provider of subscriber service signals or to the incoming service line of a second provider of incoming service signals, comprising:

first means for terminating the subscriber premises line;

second means for terminating the incoming service line of the first provider of subscriber service signals;

third means for terminating the incoming service line of a second provider of subscriber service signals; and said second and third means permitting the subscriber premises line to be connected to the incoming service line of either the first or second provider of subscriber service signals.

5. The apparatus according to claim 4 wherein said apparatus further comprises means for restricting access to said first means to the subscriber and the first and second providers of subscriber service signals, means for restricting access to said second means to said first provider of subscriber service signals and means for restricting access to said third means to said first and second providers of subscriber service signals.

6. Apparatus according to claim 4 wherein said apparatus further comprises overvoltage protection means for being connected to at least one of the incoming service lines.

7. The apparatus according to claim 4 wherein the apparatus further comprises overvoltage protection means for being connected to both of the incoming service lines.

8. The apparatus according to claim 4 wherein said apparatus further comprises jumper connecting means for interconnecting said first means to either said second or said third means.

9. Apparatus for providing at least one subscriber with subscriber service signals from one of at least first and second providers of subscriber service signals, comprising:

housing means including a base and first, second, third and fourth covers, said base including a bottom circumscribed by an outwardly extending wall and at least three separating walls extending upwardly from said bottom, said bottom, said outwardly extending wall and said separating walls providing a first compartment, a second compartment, a third compartment and a fourth compartment;

first connecting means mounted in said first compartment for being connected to at least one subscriber premises line;

second connecting means mounted in said second compartment for being connected to a first incoming service line from a first provider of subscriber service signals;

third connecting means mounted in said third compartment for being connected to a second incoming service line carrying subscriber service signals from a second provider of subscriber service signals;

fourth connecting means mounted in said fourth compartment, and upon the subscriber choosing to receive subscriber service signals from the first provider of subscriber service signals said fourth connecting means for permitting said first provider of subscriber service signals to connect the first incoming service line to the subscriber premises line to cause the subscriber to receive subscriber service signals from the first provider of subscriber service signals, and upon the subscriber choosing to discontinue the receipt of subscriber service signals from the first provider of subscriber service signals and to commence receiving subscriber service signals from the second provider of subscriber service signals, said fourth connecting means for permitting said second provider of subscriber service signals to disconnect the first incoming service line from the subscriber premises line and to connect the second incoming service line to the subscriber premises line to permit the subscriber to receive subscriber service signals from the second provider of subscriber service signals;

said first cover mounted pivotally to said base, a second cover mounted pivotally to said base and for being fastened to said base and closed over said second compartment and for restricting access to said second connecting means to the first provider of subscriber service signals, said third cover mounted pivotally to said base and for being fastened to said base and closed over said third compartment and for restricting access to said third compartment to the second provider of subscriber service signals, said fourth cover mounted pivotally to said base and for being closed and fastened over said fourth compartment and for restricting access to said fourth compartment to the first provider of subscriber service signals and the second provider of subscriber service signals, and said first cover for being fastened to said base and closed over said first compartment and said second, third and fourth covers and for restricting access to said first compartment to the subscriber, the first provider of subscriber service signals and the second provider of subscriber service signals.

10. Apparatus for providing at least a first subscriber with subscriber service signals available from at least first and second providers of subscriber service signals, the first subscriber having a first subscriber premises line, the first provider of subscriber service signals having a first incoming service line and the second provider of subscriber service signals having a second incoming service line, comprising:

housing means providing at least a first compartment, a second compartment, and a third compartment and including a first cover for being fastened closed over at least said first compartment, a second cover for being fastened closed over said second compartment, and a third cover for being fastened closed over said third compartment;

first connecting means residing in said first compartment for being connected to the first subscriber premises line;

second connecting means residing in said second compartment for being connected to the first incoming service line;

third connecting means residing in said third compartment for being connected to the second incoming service line;

said first connecting means for interconnecting the first subscriber premises line to the first incoming service line to provide the first subscriber with subscriber service signals available from the first provider of subscriber service signals; and upon the first subscriber premises line being disconnected from the first incoming service line said first connecting means for interconnecting the first subscriber premises line to the second incoming service line to provide the first subscriber with subscriber service signals available from the second provider of subscriber service signals.

11. The apparatus according to claim 10 wherein said housing means includes base means providing said compartments, wherein said first cover is mounted pivotally to said base means and is for being fastened closed over at least said first compartment, said first cover provided with first fastening means for fastening to said base means and said first fastening means for being unfastened only by the first and second providers of subscriber service signals, wherein said second cover is mounted pivotally to said base means and is provided with second fastening means for being fastened to said base means, said second fastening means for being unfastened only by the first provider of subscriber service signals, and wherein said third cover is mounted pivotally to said base means and is provided with third fastening means for being fastened to said base means and said third fastening means for being unfastened only by the second provider of subscriber service signals.

12. The apparatus according to claim 10 wherein said apparatus is for providing at least first and second subscribers with subscriber service signals available from at least the first and second providers of subscriber service signals, wherein the second subscriber has a second subscriber premises line, wherein said first connecting means is for being connected to the second subscriber premises line, wherein said first connecting means is for interconnecting the second subscriber premises line to the second incoming service line to provide the second subscriber with subscriber service signals available from the second provider of incoming subscriber signals and wherein upon the second subscriber premises line being disconnected from the second incoming service line said first connecting means for interconnecting the second subscriber premises line to the first incoming service line to provide the second subscriber with subscriber service signals available from the first provider of subscriber service signals.

13. The apparatus according to claim 12 wherein the subscriber service signals are broadband signals, wherein the first and second providers of subscriber service signals are first and second providers of broadband signals, wherein the first and second subscriber premises lines are subscriber coaxial cables, wherein the first and second incoming service lines are first and second incoming coaxial cables, wherein said first, said second, and said third connecting means each comprise coaxial cable connector means.

14. Apparatus for providing at least first and second subscribers with subscriber service signals available from at least first and second providers of subscriber service signals, the first and second subscribers having respectively first and second subscriber premises lines, the first provider of subscriber service signals having a first incoming service line and the second provider of subscriber service signals having a second incoming service line, comprising:

housing means providing at least a first compartment, a second compartment and a third compartment and including a first cover for being fastened closed over at least said first compartment and said first cover for being unfastened only by the first and second providers of subscriber service signals, a second cover for being fastened closed over said second compartment and said second cover for being unfastened only by the first provider of subscriber service signals and a third cover for being fastened closed over said third compartment and said third cover for being unfastened only by the second provider of subscriber service signals;

first connecting means residing in said first compartment for being interconnected to the first and second subscriber premises lines;

second connecting means residing in said second compartment for being connected to the first incoming service line;

third connecting means residing in said third compartment and for being connected to the second incoming service line;

said first connecting means for connecting either or both of the first and second subscriber premises lines to the first incoming service line to provide either or both of the first and second subscribers with subscriber service signals available from the first provider of subscriber service signals and for connecting either or both of the first and second subscriber premises lines to the second incoming service line to provide either or both of the first and second subscribers with subscriber service signals available from the second provider of subscriber service signals; and upon either the first or the second subscriber premises lines being first connected and then disconnected from one of the first or the second incoming service lines permitting either the first or the second subscriber premises lines to be connected to the other of the first and second incoming service lines to provide either the first or the second subscriber with subscriber service signals from the other of the first and second providers of subscriber service signals.

15. Apparatus for providing a plurality of subscribers with subscriber service signals available from at least first and second providers of subscriber service signals, the plurality of subscribers having a plurality of subscriber premises lines each associated with one of the subscribers, the first provider of subscriber service signals having a first incoming service line and a second provider of subscriber service signals having a second incoming service line, comprising:

housing means providing at least a first compartment, a second compartment and a third compartment and including a first cover for being fastened closed over at least said first compartment, a second cover for being fastened closed over said second compartment and a third cover for being fastened closed over said third compartment, said first cover for being unfastened only by the first provider of subscriber service signals and the second provider of subscriber service signals, said second cover for being unfastened only by the first provider of subscriber service signals and said third cover for being unfastened only by the second provider of subscriber service signals;

first connecting means residing in said first compartment for being connected to the plurality of subscriber premises lines;

second connecting means residing in said second compartment for being connected to the first incoming service line;

third connecting means residing in said third compartment for being connected to the second incoming service line;

said first and second connecting means for connecting the plurality of subscriber premises lines to the first incoming service line to provide all of the subscribers with subscriber service signals available from the first provider of subscriber service signals;

said first and third connecting means for interconnecting the plurality of subscriber premises lines to the second incoming service line to provide all of the subscribers with subscriber service signals available from the first provider of subscriber service signals; and said first, said second and said third connecting means for connecting any one of the plurality of subscriber premises lines to either the first or the second incoming service line to provide the one subscriber with subscriber service signals available from either the first or the second provider of subscriber service signals; and upon any one of the subscriber service lines being connected to and thereafter disconnected from one of the first or the second incoming service lines said first, said second and said third connecting means for connecting the one subscriber premises line to the other of the first and second incoming service lines.

16. Apparatus for connecting one of at least first and second incoming service lines to at least one subscriber premises line, the first incoming service line carrying subscriber service signals from a first provider of subscriber service signals and the second incoming service line carrying subscriber service signals from a second provider of subscriber service signals, comprising:

means for terminating the subscriber premises line;

means for terminating the first incoming service line;

means for terminating the second incoming service line and for connecting the subscriber premises line to either the first or the second incoming service line; and means providing overvoltage protection to at least the first incoming service line and for diverting voltage surges on the first incoming service line to ground.

17. The apparatus according to claim 16 wherein said apparatus further includes means providing overvoltage protection to the second incoming service line and for diverting overvoltage surges on the second incoming service line to ground.

18. The apparatus according to claim 17 wherein said means providing overvoltage protection to at least a first incoming service line and for diverting voltage surges on the first incoming service line to ground and said means providing overvoltage protection to the second incoming service line and for diverting overvoltage surges on the second incoming service line to ground are connected in common to ground.

19. The apparatus according to claim 16 wherein the apparatus further includes means for denying access to the means for terminating the subscriber premises line except to a subscriber associated with the subscriber premises line and to the first and second providers of subscriber service signals, means for denying access to the means for terminating the first incoming service line except to the first provider of the subscriber service signals, and means for denying access to the means for terminating the second incoming service line except to the first and second providers of subscriber service signals.

20. Apparatus for providing at least a first subscriber with subscriber service signals available from at least first and second providers of subscriber service signals, the first subscriber having a first subscriber premises line, the first provider of subscriber service signals having a first incoming service line and the second provider of subscriber service signals having a second incoming service line, comprising:

housing means providing at least a first compartment, a second compartment, and a third compartment and including a first cover for being fastened closed over at least said first compartment, a second cover for being fastened closed over said second compartment, and a third cover for being fastened closed over said third compartment;

first connecting means mounted in said first compartment for being connected to the first subscriber premises line;

second connecting means mounted in said second compartment for being connected to the first incoming service line;

overvoltage protection means and grounding means mounted in said housing, said overvoltage protection means connected to at least said second connecting means, and said overvoltage protection means for diverting voltage surges on at least the first incoming service line to said grounding means;

third connecting means mounted in said third compartment and for interconnecting the first subscriber premises line to the first incoming service line to provide the first subscriber with subscriber service signals available from the first provider of incoming subscriber service signals; and upon the first subscriber premises line being disconnected from the first incoming service line said third connecting means for interconnecting the first subscriber premises line to the second incoming service line to provide the first subscriber with incoming subscriber service signals available from the second provider of incoming subscriber service signals.

21. The apparatus according to claim 20 wherein said housing means includes base means providing said compartments, wherein said first cover is mounted pivotally to said base means and is for being fastened closed over said first compartment and said first cover and said second cover, said first cover provided with first fastening means for fastening to said base means and said first fastening means for being unfastened only by the first subscriber and the first and second providers of incoming subscriber service signals, wherein said second cover is mounted pivotally to said base means and is provided with second fastening means for being fastened to said base means, said second fastening means for being unfastened only by the first provider of incoming subscriber service signals, and wherein said third cover is mounted pivotally to said second cover and is provided with third fastening means for being fastened to said second cover and said third fastening means for being unfastened only by the first and second providers of incoming subscriber service signals.

22. The apparatus according to claim 20 wherein said overvoltage protection means and said grounding means are mounted in said second compartment and wherein said overvoltage protection means are for diverting voltage surges on the first incoming service line to said grounding means.

23. The apparatus according to claim 20 wherein said overvoltage protection means comprise first overvoltage protection means and second overvoltage protection means and wherein said grounding means comprise first grounding means and second grounding means, said first grounding means and said second grounding means connected in common to earth ground, wherein said first overvoltage protection means and said first grounding means are mounted in said second compartment and wherein said first overvoltage protection means are connected to said second connecting means, and wherein said first overvoltage protection means are for diverting voltage surges on the first incoming service line to said first grounding means, wherein said second overvoltage protection means and said second grounding means are mounted in said third compartment and wherein said second overvoltage protection means are connected to said third connecting means, and wherein said second overvoltage protection means are for diverting voltage surges on the second incoming service line to said second grounding means.

24. The apparatus according to claim 20 wherein the incoming subscriber service signals are incoming telephone line signals, wherein the first and second providers of incoming subscriber service signals are first and second providers of incoming telephone line signals, wherein the first and said second incoming service lines are first and second incoming telephone lines, wherein said first connecting means comprise at least one individual subscriber line module, and wherein said second and third connecting means each comprise at least one pair of telephone terminals.

25. The apparatus according to claim 20 wherein the incoming subscriber service signals are incoming broadband signals, wherein the first and second providers of incoming subscriber service signals are first and second providers of broadband signals, wherein the first subscriber premises line is a coaxial cable, wherein the first and second incoming service lines are first and second incoming coaxial cables, wherein said first, said second, and said third connecting means each comprise coaxial cable connector mean.

26. The apparatus according to claim 20 wherein said incoming subscriber service signals comprise incoming telephone line signals and incoming broadband signals, wherein the first and second providers of incoming subscriber service signals comprise first and second providers of incoming telephone line signals and broadband signals, wherein the first subscriber premises line comprises a telephone subscriber premises line and a coaxial cable, wherein the first and said second incoming service lines comprise first and second incoming telephone lines and first and second incoming coaxial cables, wherein said first connecting means comprise at least one individual subscriber line module and at least one coaxial cable connector; wherein said second connecting means comprise at least one pair of telephone terminals and a coaxial cable connector, and wherein said third connecting means comprise a pair of telephone terminals and a coaxial cable connector.

27. The apparatus according to claim 21 wherein said first fastening means comprise override fastening means permitting the subscriber to lock the first cover to the override means to limit access to said first compartment to only the subscriber and the first and second providers of incoming subscriber service signals and said override means permitting the first and second providers of incoming subscriber service signals to unfasten said first cover from said base means while said first cover remains locked to said override means.

28. Apparatus for providing at least one subscriber with subscriber service signals from at least first and second providers of subscriber service signals, comprising:

first connecting means for being connected to at least one subscriber premises line;

second connecting means for being connected to a first incoming service line carrying subscriber signals provided by a first provider of subscriber service signals;

third connecting means for being connected to a second incoming service line carrying subscriber service signals from a second provider of subscriber service signals; and fourth connecting means for permitting the first provider of subscriber service signals to connect the first incoming service line to the subscriber premises line to provide subscriber service signals to the subscriber upon the subscriber choosing to receive subscriber service signals from the first provider of subscriber service signals, and said fourth connecting means for permitting the second provider of subscriber service signals to disconnect from the subscriber premises line the first incoming service line and to thereafter connect the second incoming service line to the subscriber premises line to permit the subscriber to receive subscriber service signals from the second provider of subscriber service signals upon the subscriber choosing to discontinue receipt of subscriber service signals from the first provider of subscriber service signals and to commence the receipt of subscriber service signals from the second provider of subscriber service signals.

29. The apparatus according to claim 28 wherein said apparatus further comprises first overvoltage protection means and first ground connecting means connected to the first incoming service line to divert overvoltage surges on the first incoming service line to earth ground.

30. The apparatus according to claim 29 further comprising second overvoltage protection means and second ground connecting means for diverting overvoltage surges on the second incoming service line to earth ground, and wherein said first and second ground connecting means are connected in common to earth ground.

31. The apparatus according to claim 28 further comprising housing means providing a first compartment in which said first connecting means are mounted, a second compartment in which said second connecting means are mounted, a third compartment in which said third connecting means are mounted, and a fourth compartment in which said fourth connecting means are mounted, said housing further comprising first access restriction means for restricting access to said first compartment to the subscriber, the first provider of subscriber service signals and the second provider of subscriber service signals, second access restricting means for restricting access to said second compartment to said first provider of subscriber service signals; and third access restriction means for restricting access to said third compartment to the second provider of subscriber service signals, and fourth access restriction means for restricting access to said fourth compartment to said first provider of subscriber service signals and to said second provider of subscriber service signals.

32. Apparatus according to claim 28 wherein the subscriber service signals are telephone line signals, wherein the first and second providers of subscriber service signals are first and second providers of telephone line signals, wherein the at least one subscriber premises line is at least one telephone subscriber premises line, wherein said first connecting means comprise a first pair of subscriber terminals for being connected to the telephone subscriber premises line, wherein the first incoming service line is a first incoming telephone line, wherein the second connecting means comprise a first pair of telephone terminals for being connected to the first incoming telephone line, wherein the second incoming service line is a second incoming telephone line, wherein the third connecting means comprise a third pair of telephone terminals for being connected to the second incoming telephone line, and wherein said fourth connecting means comprise a fourth pair of telephone terminals.

33. The apparatus according to claim 28 wherein the subscriber service signals are broadband signals, wherein the first and second providers of subscriber service signals are first and second providers of broadband signals, wherein the at least one subscriber premises line is a subscriber coaxial cable, wherein said first connecting means is a first coaxial cable connector, wherein the first incoming service line is a first incoming coaxial cable, wherein said second connecting means comprise a second coaxial cable connector, wherein the second incoming service line is a second incoming coaxial cable, wherein said third connecting means comprise a third coaxial cable connector, and wherein said fourth connecting means comprise a fourth coaxial cable connector.

34. The apparatus according to claim 28 wherein the subscriber service signals are telephone line signals and broadband signals, wherein the at least first and second providers of subscriber service signals are at least first and second providers of telephone line signals and broadband signals, wherein the at least one subscriber premises line comprises at least one telephone subscriber premises line and at least one subscriber coaxial cable, wherein the first incoming service line comprises a first incoming telephone line and a first incoming coaxial cable, wherein said second connecting means comprise a second pair of telephone terminals and a second coaxial cable connector, wherein the second incoming service line comprises a second incoming telephone line and a second incoming coaxial cable, wherein said third connecting means comprise a third pair of telephone terminals and a third coaxial cable connector, and wherein said fourth connecting means comprise a fourth pair of telephone terminals and a fourth coaxial cable connector.

35. Apparatus for providing a plurality of subscribers with subscriber service signals available from at least first and second providers of subscriber service signals, the plurality of subscribers having a plurality of subscriber premises lines each associated with one of the subscribers, the first provider of subscriber service signals having a first incoming service line and a second provider of subscriber service signals having a second incoming service line, comprising:

housing means providing at least a first compartment, a second compartment and a third compartment and including a first cover for being fastened closed over at least said first compartment, a second cover for being fastened closed over said second compartment and a third cover for being fastened closed over said third compartment, said first cover for being unfastened only by the first provider of subscriber service signals and the second provider of subscriber service signals, said second cover for being unfastened only by the first provider of subscriber service signals and said third cover for being unfastened only by the second provider of subscriber service signals;

first connecting means residing in said first compartment and including a first plurality of connectors equal in number to the plurality of subscriber premises lines and for being connected to the plurality of subscriber premises lines;

second connecting means residing in said second compartment and provided with a second plurality of connectors equal in number to said first plurality of connectors;

third connecting means residing in said third compartment and providing a third plurality of connectors equal in number to said first plurality of connectors;

said first connecting means and said second connecting means for permitting one or more jumper lines to interconnect one or all of said plurality of subscriber premises lines to the first incoming service line to provide one or all of the plurality of subscribers with subscriber service signals available from the first provider of subscriber service signals;

said first connecting means and said third connecting means for permitting one or more jumper lines to interconnect one or all of the plurality of subscriber premises lines to the second incoming service line to provide one or all of the plurality of subscribers with subscriber service signals available from the second provider of subscriber service signals; and upon any one of the plurality of subscriber premises lines being first connected to and then disconnected from one of the first and second incoming service lines by one of the jumper lines, said first, said second and said third connecting means permitting the one subscriber premises line to be connected to the other of the first and second incoming service lines.

36. The apparatus according to claim 35 wherein the subscriber service signals are broadband signals, wherein the first and second providers of subscriber service signals are first and second providers of broadband signals, wherein the plurality of subscriber premises lines are a plurality of subscriber coaxial cables, wherein the first and second incoming service lines are first and second incoming coaxial cables and wherein said second and third connecting means are respective first and second tap means for respectively tapping the first and second incoming coaxial cables to provide from each of the first and second incoming coaxial cables a plurality of broadband signal outputs equal in number to the plurality of subscriber premises lines.

37. Apparatus for permitting either of at least first and second providers of subscriber service signals to connect its incoming service line to the subscriber premises line of at least a first subscriber of subscriber service signals, comprising:

first terminating means for terminating the subscriber premises line; and second terminating means for terminating the incoming service lines of the at least first and second providers of subscriber service signals and for permitting either of the at least first and second providers of subscriber service signals to connect its incoming service line to the subscriber premises line and for permitting either of the at least first and second providers of subscriber service signals to disconnect from the subscriber premises line the incoming service line of the other provider of subscriber service signals previously connected to the subscriber premises line and thereafter connect its incoming service line to the subscriber premises line.

38. The apparatus according to claim 37 wherein said second terminating means comprise first connecting means for being connected to the incoming service line of the first provider of subscriber service signals and second connecting means for permitting the first provider of subscriber service signals to connect its incoming service line to the subscriber premises line, and wherein said second connecting means are for terminating the incoming service line of the second provider of subscriber service signals and for permitting the second provider of subscriber service signals to disconnect from the subscriber premises line the incoming service line of the first provider of subscriber service signals and thereafter to connect its incoming service line to the subscriber premises line.

39. The apparatus according to claim 38 wherein the subscriber service signals are telephone line signals, wherein the subscriber premises line is a telephone subscriber premises line, wherein the incoming service line of the first provider of subscriber service signals is a first incoming telephone line, and wherein said first connecting means comprise a first pair of telephone terminals for being connected to the first incoming telephone line, wherein the incoming service line of the second provider of subscriber service signals is a second incoming telephone line and wherein said second connecting means comprise a second pair of telephone terminals for being connected to the second incoming telephone line.

40. The apparatus according to claim 39 wherein said first terminating means comprise an individual subscriber line module providing a pair of subscriber terminals for being connected to the telephone subscriber premises line.

41. The apparatus according to claim 38 wherein the subscriber premises line comprises a telephone subscriber premises line for receiving telephone line signals and a subscriber coaxial cable for receiving broadband signals, wherein the incoming service line of the first provider of subscriber service signals comprises a first incoming telephone line for carrying telephone line signals and a first incoming coaxial cable for carrying broadband signals, and wherein said first connecting means comprise a first pair of telephone terminals for being connected to the first incoming telephone line and a first coaxial cable connector for being connected to the first incoming coaxial cable, wherein the incoming service line of the second provider of subscriber service signals comprises a second incoming telephone line for carrying telephone line signals and a second incoming coaxial cable for carrying broadband signals, and wherein the second connecting means comprise a pair of telephone terminals for being connected to the second incoming telephone line and a coaxial cable connector for being connected to the second incoming coaxial cable.

42. The apparatus according to claim 41 wherein the first terminating means comprise an individual subscriber module providing a first pair of subscriber terminals for being connected to the telephone subscriber premises line and a third coaxial cable connector for being connected to the subscriber coaxial cable.

43. The apparatus according to claim 37 wherein said second terminating means comprise first connecting means for being connected to the incoming service line of the first provider of subscriber service signals, second connecting means for being connected to the incoming service line of the second provider of subscriber service signals and third connecting means for permitting either the first provider or the second provider of subscriber service signals to connect its incoming service line to the subscriber premises line and for permitting either of the first or second provider of subscriber service signals to disconnect from the subscriber premises line the incoming service line of the other provider of subscriber service signals previously connected to the subscriber premises line and thereafter connect its incoming service line to the subscriber premises line.

44. The apparatus according to claim 43 wherein the subscriber service signals are telephone line signals, wherein the subscriber premises line is a telephone subscriber premises line, wherein said first terminating means comprise a pair of subscriber terminals for being connected to the telephone subscriber premises line, wherein the incoming service line of the first provider of subscriber service signals is a first incoming telephone line and wherein said first connecting means comprise a pair of telephone terminals for being connected to the first incoming telephone line, wherein the incoming service line of the second provider of subscriber service signals is a second incoming telephone line and wherein said second connecting means comprise a second pair of telephone terminals for being connected to the second incoming telephone line, and wherein said third connecting means comprise a pair of telephone terminals for connecting the telephone subscriber premises line with either the first or second incoming telephone line.

45. The apparatus according to claim 43 wherein the subscriber service signals are broadband signals, wherein the subscriber premises line is a subscriber coaxial cable, wherein said first terminating means comprise a coaxial cable connector for being connected to the subscriber coaxial cable, wherein the incoming service line of the first provider of subscriber service signals is a first incoming coaxial cable and wherein said first connecting means comprise a coaxial cable connector for being connected to the first incoming coaxial cable, wherein the incoming service line of the second provider of subscriber service signals is a second incoming coaxial cable and wherein said second connecting means comprise a coaxial cable connector for being connected to the second incoming coaxial cable, and wherein said third connecting means comprise a coaxial cable connector for connecting the subscriber coaxial cable with either the first or second incoming coaxial cable.

46. The apparatus according to claim 38 wherein the subscriber services signals are broadband signals, wherein the subscriber premises line is a subscriber coaxial cable, wherein the incoming service line of the first provider of subscriber service signals is a first incoming coaxial cable, and wherein said first connecting means comprise a coaxial cable connector for being connected to the first incoming coaxial cable, wherein the incoming service line of the second provider of subscriber service signals is a second incoming coaxial cable, and wherein the second connecting means comprise a coaxial cable connector for being connected to the second incoming coaxial cable.

* * * * *